(12) United States Patent
Maruyama et al.

(10) Patent No.: US 10,220,515 B2
(45) Date of Patent: Mar. 5, 2019

(54) ROBOT AND CONTROL METHOD FOR ROBOT

(71) Applicant: Seiko Epson Corporation, Tokyo (JP)

(72) Inventors: Kenichi Maruyama, Tatsuno-machi (JP); Ryuichi Okada, Matsumoto (JP); Sota Yamamoto, Matsumoto (JP); Toshio Tanaka, Azumino (JP)

(73) Assignee: Seiko Epson Corporation (JP)

( * ) Notice: Subject to any disclaimer, the term of this patent is extended or adjusted under 35 U.S.C. 154(b) by 123 days.

(21) Appl. No.: 15/362,264

(22) Filed: Nov. 28, 2016

(65) Prior Publication Data

US 2017/0151669 A1 Jun. 1, 2017

(30) Foreign Application Priority Data

Nov. 30, 2015 (JP) ................. 2015-232823
Nov. 30, 2015 (JP) ................. 2015-232826

(51) Int. Cl.
| | | |
|---|---|---|
| B25J 9/00 | (2006.01) | |
| B25J 9/16 | (2006.01) | |
| B31B 50/52 | (2017.01) | |
| B31B 50/26 | (2017.01) | |
| B31B 50/00 | (2017.01) | |
| B31B 110/35 | (2017.01) | |
| B31B 100/00 | (2017.01) | |

(52) U.S. Cl.
CPC ........... *B25J 9/1682* (2013.01); *B25J 9/0087* (2013.01); *B25J 9/1679* (2013.01); *B31B 50/006* (2017.08); *B31B 50/262* (2017.08); *B31B 50/52* (2017.08); *B31B 2100/0022* (2017.08); *B31B 2110/35* (2017.08); *G05B 2219/40076* (2013.01); *Y10S 901/02* (2013.01)

(58) Field of Classification Search
USPC .................................................. 700/245–264
See application file for complete search history.

(56) References Cited

U.S. PATENT DOCUMENTS

| | | | | |
|---|---|---|---|---|
| 4,046,001 A | * | 9/1977 | Maeda ....................... | G01L 5/00 493/313 |
| 4,791,588 A | * | 12/1988 | Onda ................... | G05B 19/423 700/260 |
| 5,419,202 A | * | 5/1995 | Howard ................... | G01N 3/20 493/37 |
| 5,573,626 A | * | 11/1996 | Rossini ................. | B65B 51/067 156/361 |

(Continued)

FOREIGN PATENT DOCUMENTS

| | | |
|---|---|---|
| JP | 2002-036389 A | 2/2002 |
| JP | 2005-001304 A | 1/2005 |

(Continued)

*Primary Examiner* — Jonathan L Sample
(74) *Attorney, Agent, or Firm* — Harness, Dickey & Pierce, P.L.C.

(57) ABSTRACT

A robot includes a first arm and a second arm. The robot molds a box body including a first plate body, a second plate body, a third plate body, and a fourth plate body, the first plate body and the second plate body being coupled in a first part, the second plate body and the third plate body being coupled in a second part, the third plate body and the fourth plate body being coupled in a third part, and the fourth plate body and the first plate body being coupled in a fourth part.

6 Claims, 30 Drawing Sheets

(56) References Cited

U.S. PATENT DOCUMENTS

| | | | |
|---|---|---|---|
| 6,837,892 B2* | 1/2005 | Shoham | A61B 17/1757 606/130 |
| 7,399,267 B2* | 7/2008 | Moen | B31F 1/2813 493/101 |
| 7,510,517 B2* | 3/2009 | Goodman | 493/313 |
| 8,128,547 B2* | 3/2012 | Graham | B31B 50/00 493/167 |
| 8,550,970 B2* | 10/2013 | Panepinto | B31B 50/00 493/128 |
| 9,060,678 B2* | 6/2015 | Larkin | A61B 1/00087 |
| 9,233,470 B1* | 1/2016 | Bradski | B25J 9/163 |
| 9,393,693 B1* | 7/2016 | Kalakrishnan | B25J 9/1671 |
| 9,718,570 B1* | 8/2017 | Ortiz | B65B 43/305 |
| 2006/0089633 A1* | 4/2006 | Bleich | A61B 17/1659 606/32 |
| 2007/0013336 A1* | 1/2007 | Nowlin | B25J 9/1682 318/568.21 |
| 2007/0120512 A1* | 5/2007 | Albu-Schaffer | B25J 9/1633 318/568.2 |
| 2008/0046122 A1* | 2/2008 | Manzo | A61B 1/00149 700/245 |
| 2008/0307630 A1* | 12/2008 | Hasegawa | B21D 19/043 29/509 |
| 2009/0025343 A1* | 1/2009 | Salm | B65B 43/185 53/458 |
| 2009/0088774 A1* | 4/2009 | Swarup | A61B 34/37 606/130 |
| 2009/0291816 A1* | 11/2009 | Gebhardt | 493/313 |
| 2011/0071677 A1* | 3/2011 | Stilman | B25J 5/007 700/254 |
| 2011/0283668 A1* | 11/2011 | Bellante | B65B 5/024 53/563 |
| 2012/0061981 A1* | 3/2012 | Motonaga | B25J 15/0004 294/213 |
| 2012/0233967 A1* | 9/2012 | Bellante | B25J 9/0084 53/443 |
| 2013/0036716 A1* | 2/2013 | Tsutsumi | B65B 43/305 53/564 |
| 2013/0345875 A1* | 12/2013 | Brooks | B25J 9/0087 700/259 |
| 2014/0179501 A1 | 6/2014 | Akama et al. | |
| 2014/0336669 A1* | 11/2014 | Park | A61B 19/2203 606/130 |
| 2014/0379130 A1* | 12/2014 | Lee | B62D 1/02 700/259 |
| 2015/0290795 A1* | 10/2015 | Oleynik | G05B 19/42 700/257 |
| 2016/0000512 A1* | 1/2016 | Gombert | A61B 19/2203 606/130 |
| 2016/0030117 A1* | 2/2016 | Mewes | A61B 19/2203 600/424 |
| 2016/0030240 A1* | 2/2016 | Gonenc | G01L 5/226 604/95.01 |

FOREIGN PATENT DOCUMENTS

| | | |
|---|---|---|
| JP | 2008-254815 A | 10/2008 |
| JP | 2014-117766 A | 6/2014 |
| JP | 2014-124798 A | 7/2014 |

* cited by examiner

ROBOT AND CONTROL METHOD FOR ROBOT

BACKGROUND

1. Technical Field

The present invention relates to a robot and a control method for the robot.

2. Related Art

Work for assembling a box using a robot has been performed.

For example, in a robot system described in JP-A-2014-124798 (Patent Literature 1), a robot includes a hand that attracts a box material and a robot main body to which the hand is attached, the robot main body performing assembly of the box material while moving, in a predetermined direction, the box material attracted by the hand. In the robot system, for example, an attracting section is disposed at the distal end of an arm section coupled to a frame to be capable of turning around a predetermining turning axis. The attracting section is configured to be turned around the turning axis by an air cylinder (see claim 1, paragraph 0020, and the like of Patent Literature 1).

Assembling of two different components by a robot has been performed.

For example, in a robot apparatus and an assembly method for components described in JP-A-2014-117766 (Patent Literature 2), assembling for inserting a cylindrical component into an easily elastically deformable annular component is performed (see Patent Literature 2).

However, in the robot apparatus and the assembly method for components described in Patent Literature 2, work for aligning concentric axes of the annular component and the cylindrical component and incorporating the components is performed. End effectors having a complicated mechanism are necessary in a robot. When a set of a plurality of components (a set of the annular component and the cylindrical component) needs to be simultaneously incorporated, the assembly method is inadaptable. When an easily elastically deformable component is assembled, assembling by impedance control is difficult. Therefore, it is almost impossible to assemble the easily elastically deformable component.

In the robot in the past described in Patent Literature 1, when work for assembling a box is performed, the box material is attracted using air to be fixed or raised.

However, in such a robot in the past, when the work for assembling the box is performed, the air or a peripheral device including complicated wiring or complicated piping such as a cylinder is necessary.

In the robot in the past described in Patent Literature 2, in order to fit an elastic component in another component, complicated operation for, for example, twisting the elastic component or pushing in the elastic component several times is sometimes necessary. In order to fit a plurality of elastic components, fitting operation needs to be executed a number of times equivalent to the number of elastic components. In such a robot in the past, assembling work of components is sometimes complicated.

SUMMARY

An advantage of some aspects of the invention is to solve at least a part of the problems described above, and the invention can be implemented as the following forms or aspects.

First Aspect

An aspect of the invention is directed to a robot including a first arm and a second arm. The robot molds a box body including a first plate body, a second plate body, a third plate body, and a fourth plate body, the first plate body and the second plate body being coupled in a first part, the second plate body and the third plate body being coupled in a second part, the third plate body and the fourth plate body being coupled in a third part, and the fourth plate body and the first plate body being coupled in a fourth part. When a first angle formed by the first plate body and the second plate body is larger than a second angle formed by the second plate body and the third plate body, when a state at the time when the first angle is an angle of a folded-up state of the box body is represented as a first state and a state in which the first angle is smaller than the angle in the folded-up state is represented as a second state, the robot brings a first contact section provided in the first arm into contact with the fourth part, brings a second contact section provided in the second arm into contact with the second part, and applies torque to a joint of the robot to change the first state to the second state.

With this configuration, the robot raises, from the folded-up state of the box body, portions of the first to fourth plate bodies included in the box body. Consequently, the robot can easily assemble the box body.

Second Aspect

The aspect of the invention may be configured such that, in the robot, the angle in the folded-up state of the box body is 180 degrees.

With this configuration, the robot raises, from the folded-up state of the box body, the portions of the first to fourth plate bodies included in the box body. Consequently, the robot can easily assemble the box body.

Third Aspect

The aspect of the invention may be configured such that, in the robot, the first contact section and the second contact section are respectively planes, and the robot sets a surface of the first contact section and a surface of the second contact section to be parallel, brings the first contact section into contact with the fourth part, and brings the second contact section into contact with the second part.

With this configuration, the robot sets the surface of the first contact section and the surface of the second contact section in parallel and raises the portions of the first to fourth plate bodies included in the box body. Consequently, the robot can easily assemble the box body.

Fourth Aspect

The aspect of the invention may be configured such that, in the robot, in order to change the first state to the second state, in a state in which the first contact section is set in contact with the fourth part and the second contact section is set in contact with the second part, the robot pushes, with the first arm, the fourth part in a first direction extending from the third plate body to the first plate body and a second direction extending from the third part to the second part.

With this configuration, the robot raises the portions of the first to fourth plate bodies included in the box body by pushing the portions in a predetermined direction with the first contact section and the second contact section. Consequently, the robot can easily assemble the box body.

Fifth Aspect

The aspect of the invention may be configured such that, in the robot, after pushing, with the first arm, the fourth part in the first direction and the second direction, the robot pushes the fourth part in the second direction.

With this configuration, the robot raises the portions of the first to fourth plate bodies included in the box body by, after pushing the portions in a predetermined direction with the first contact section and the second contact section, pushing the portions in another predetermined direction. Consequently, the robot can easily assemble the box body.

Sixth Aspect

The aspect of the invention may be configured such that, in the robot, after pushing the fourth part in the second direction with the first arm, the robot grips the box body with a second gripping section provided in the second arm and presses, with the first arm, a jig for fixing the first angle against the box body.

With this configuration, after raising the portions of the first to fourth plate bodies included in the box body, the robot presses a predetermined jig against the box body. Consequently, the robot can fix the assembled box body with the jig.

Seventh Aspect

An aspect of the invention is directed to a control method for a robot, the control method including: controlling a robot including a first arm and a second arm; and molding a box body including a first plate body, a second plate body, a third plate body, and a fourth plate body, the first plate body and the second plate body being coupled in a first part, the second plate body and the third plate body being coupled in a second part, the third plate body and the fourth plate body being coupled in a third part, and the fourth plate body and the first plate body being coupled in a fourth part. When a first angle formed by the first plate body and the second plate body is larger than a second angle formed by the second plate body and the third plate body, when a state at the time when the first angle is an angle of a folded-up state of the box body is represented as a first state and a state in which the first angle is smaller than the angle in the folded-up state is represented as a second state, a first contact section provided in the first arm is brought into contact with the fourth part, a second contact section provided in the second arm is brought into contact with the second part, and torque is applied to a joint of the robot to change the first state to the second state.

With this configuration, in the control method for the robot, portions of the first to fourth plate bodies included in the box body are raised from the folded-up state of the box body by the robot. Consequently, the box body can be easily assembled by the robot.

As explained above, with the robot and the control method according to the aspects of the invention, the portions of the first to fourth plate bodies included in the box body are raised from the folded-up state of the box body. Consequently, in the robot and the control method according to the aspects of the invention, the box body can be easily assembled.

Eighth Aspect

An aspect of the invention is directed to a robot that fits a first fitting portion of an object and a second fitting portion of a spring, and in a state in which a first hole portion of the object and a second hole portion of the spring are inserted over a pin, the robot presses one of the object and the spring against the other in an axial direction of the pin to fit the first fitting portion and the second fitting portion.

With this configuration, in the state in which the first hole portion of the object and the second hole portion of the spring are inserted over the pin, the robot presses one of the object or the spring against the other to fit the first fitting portion and the second fitting portion. Consequently, the robot can easily perform assembling work of components.

Ninth Aspect

The robot described in the eighth aspect may be configured such that the robot includes a hand, a palm is provided in the hand, and the robot presses the object or the spring with the palm.

With this configuration, the robot presses the object or the spring with the palm of the hand. Consequently, the robot can perform the pressing in a stable direction with, for example, the surface of the palm.

Tenth Aspect

The robot described in the eighth aspect or the ninth aspect may be configured such that the first fitting portion side of the object is a plane, the plane and an axial direction of the pin are orthogonal, and the robot presses a surface of the palm against the plane in parallel.

With this configuration, the robot presses the surface of the palm against the plane on the first fitting portion side of the object in parallel. The plane and the axial direction of the pin are orthogonal. Consequently, the robot can perform the stable pressing.

Eleventh Aspect

The robot described in any one of the eighth aspect to the tenth aspect may be configured such that the first fitting portion and the second fitting portion are tubular and, when the object or the spring is pressed, at least one of the first fitting portion and the second fitting portion is elastically deformed or plastically deformed and the first fitting portion and the second fitting portion are press-fit with each other.

With this configuration, in the robot, at least one of the first fitting portion and the second fitting portion is elastically deformed or plastically deformed and the first fitting portion and the second fitting portion are press-fit with each other. Consequently, the robot can fit the first fitting portion and the second fitting portion using the elastic deformation or the plastic deformation.

Twelfth Aspect

The robot described in any one of the eighth aspect to the eleventh aspect may be configured such that the pin is taper-like.

With this configuration, in the robot, the pin is taper-like. Consequently, the robot can make easy to insert a hole portion over the pin using the taper-like pin.

Thirteenth Aspect

The robot according to any one of the eighth aspect to the twelfth aspect may be configured such that the robot includes a force sensor and presses the object or the spring on the basis of reaction of the force sensor until a force having a predetermined value or more is applied.

With this configuration, the robot presses the object or the spring on the basis of the reaction of the force sensor until the force having the predetermined value or more is applied. Consequently, the robot can determine completion of the pressing using the force sensor.

Fourteenth Aspect

The robot according to any one of the eighth aspect to the thirteenth aspect may be configured such that the robot includes an arm, a block is attached to the arm, and the robot presses the object or the spring with the block.

With this configuration, the robot presses the object or the spring with the block attached to the arm. Consequently, for example, when an area of a pressing region is small, the robot can perform the pressing using a block adjusted to the size or the shape of the pressing region.

Fifteenth Aspect

An aspect of the invention is directed to a control method for controlling a robot that fits a first fitting portion of an object and a second fitting portion of a spring, and in a state in which a first hole portion of the object and a second hole portion of the spring are inserted over a pin, one of the object and the spring is pressed against the other in an axial direction of the pin by the robot to fit the first fitting portion and the second fitting portion.

With this configuration, in the control method, in the state in which the first hole portion of the object and the second hole portion of the spring are inserted over the pin, one of the object or the spring is pressed against the other to fit the first fitting portion and the second fitting portion. Consequently, in the control method, it is possible to easily perform assembling work of components.

As explained above, with the robot and the control method according to the aspects of the invention, in the state in which the first hole portion of the object and the second hole portion of the spring are inserted over the pin, one of the object or the spring is pressed against the other to fit the first fitting portion and the second fitting portion. Consequently, in the robot and the control method according to the aspects of the invention, it is possible to easily perform assembling work of components.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention is explained in detail with reference to the drawings.

A Box Material and a Box

In this embodiment, a box is assembled from a box material by a robot system.

In this embodiment, for convenience of explanation, materials in a state in which the box is not completed are referred to as "box material" and a state in which the box is completed is referred to as "box". However, the box material and the box indicate the same object except that whether the box is completed (i.e., apparent shapes are different).

Overview of the Robot System

The robot system according to this embodiment includes a robot and peripheral objects of the robot. The peripheral objects are, for example, a jig, a table, and an image pickup section. The peripheral objects may include a box material (or a completed box). The peripheral objects may include other objects used in work.

Note that, in this embodiment, the image pickup section is included integrally with the robot. However, the image pickup section may be included separately from the robot.

The table may be grasped as a type of the jig.

Overview of the Robot

Figure 1:
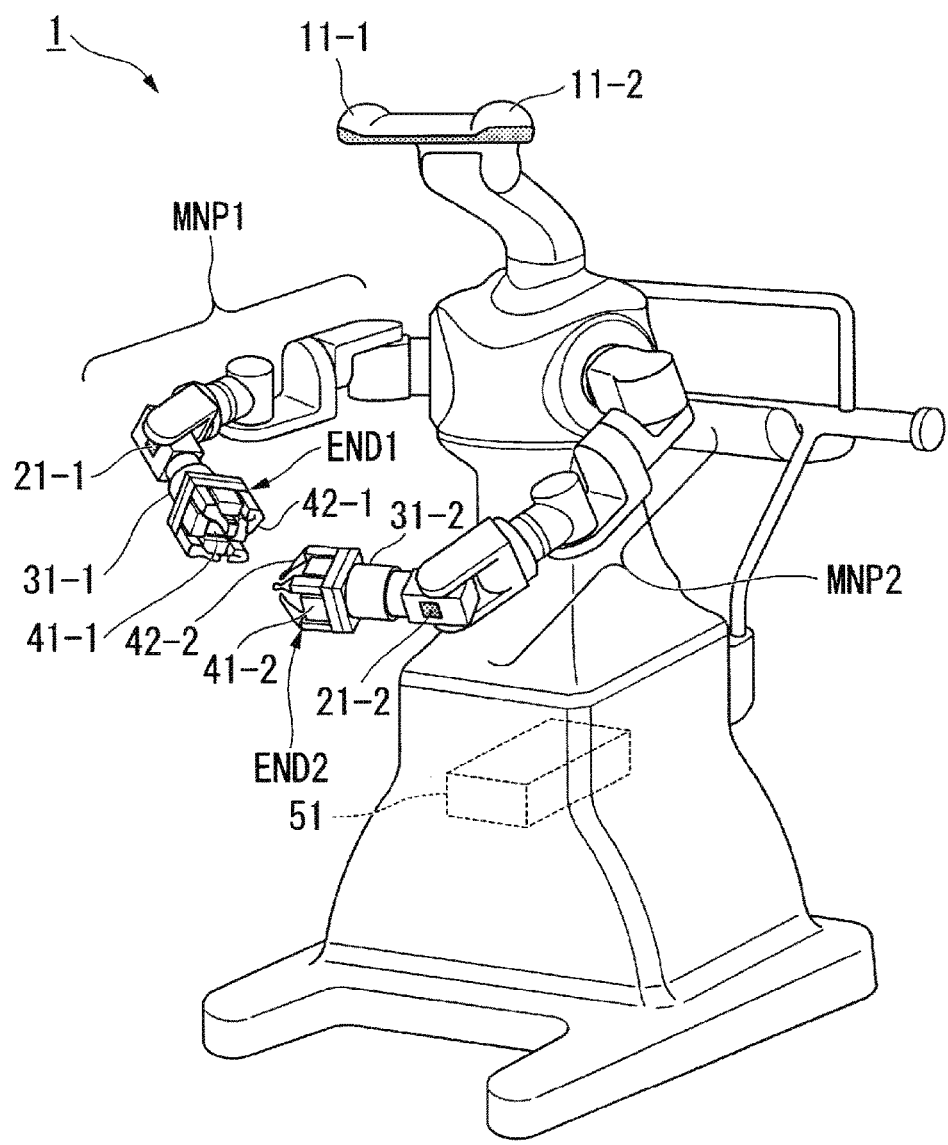
FIG. 1 is a diagram showing a schematic configuration example of a robot in a robot system according to an embodiment of the invention.

FIG. 1 is a diagram showing a schematic configuration example of a robot 1 in a robot system according to an embodiment of the invention.

The robot 1 includes a head section present in an upper part, a body section present in a center part, and a base section (a portion of a base) present in a lower part, and arm sections provided in the body section.

The robot 1 is a double-arm robot including two arms as the arm sections.

The robot 1 includes, as components on one arm side, a first manipulator MNP1, a first force sensor 31-1, and a first end effector END1. These components are integrated. In this embodiment, the robot 1 includes the first force sensor 31-1 between the first manipulator MNP1 and the first end effector END1.

The robot 1 includes, as components on the other arm section, a second manipulator MNP2, a second force sensor 31-2, and a second end effector END2. These components are integrated. In this embodiment, the robot 1 includes the second force sensor 31-2 between the second manipulator MNP2 and the second end effector END2.

In this embodiment, a hand is used as the first end effector END1. The hand includes four claws (which may be called fingers) and a first palm 41-1. The first palm 41-1 includes a flat surface. The hand includes a column that supports the first palm 41-1. The length of the column appearing on the outside of the hand increases and decreases to enable pressing or pulling by the flat surface of the first palm 41-1. Note that, in the example shown in FIG. 1, one of the four claws is denoted by a sign (claw 42-1).

In this embodiment, a hand is used as the second end effector END2. The hand includes four claws (which may be called fingers) and a second palm 41-2. The second palm 41-2 includes a flat surface. The hand includes a column that supports the second palm 41-2. The length of the column appearing on the outside of the hand increases and decreases to enable pressing or pulling by the flat surface of the second palm 41-2. Note that, in the example shown in FIG. 1, one of the four claws is denoted by a sign (claw 42-2).

In this embodiment, it is possible to perform operation having a seven-axis degree of freedom with the configuration on one arm side (the first manipulator MNP1 attached with the first end effector END1). It is possible to perform the operation having the seven-axis degree of freedom with the configuration on the other arm side (the second manipulator MNP2 attached with the second end effector END2).

However, as another configuration example, a configuration may be adopted in which operation having a degree of freedom of six axes or less or eight axes or more is performed.

When the arm operates with the seven-axis degree of freedom, postures that the arm can take increases compared with when the arm operates with the degree of freedom of six axes or less. Consequently, for example, the operation becomes smooth. It is possible to easily avoid interference with an object present around the arm. When the arm operates with the seven-axis degree of freedom, the control of the arm is easy because computational complexity of the control is small compared with when the arm operates with the degree of freedom of eight axes or more. Because of such reasons, in this embodiment, as a preferred example, the arm that operates with the seven-axis degree of freedom is used.

In this embodiment, the robot 1 includes joins (actuators) of seven axes on the one arm side (the side of the first manipulator MNP1 attached with the first end effector END1). The robot 1 performs operation on the one arm side by applying torque to the joints. Similarly, the robot 1 includes joins (actuators) of seven axes on the other arm side (the side of the second manipulator MNP2 attached with the second end effector END2). The robot 1 performs operation on the other arm side by applying torque to the joints.

In this embodiment, the body section is capable of rotating with a one-axis degree of freedom in the portion of a waist.

The robot 1 includes two image pickup sections (a first image pickup section 11-1 and a second image pickup section 11-1) respectively provided on the left and the right of the head section, an image pickup section (a third image pickup section 21-1) provided in a predetermined part of the first manipulator MNP1, and an image pickup section (a fourth image pickup section 21-2) provided in a predetermined part of the second manipulator MNP2.

The respective image pickup sections (the first image pickup section 11-1, the second image pickup section 11-2, the third image pickup section 21-1, and the fourth image pickup section 21-2) are cameras including a CCD (Charge Coupled Device) or a CMOS (Complementary Metal Oxide Semiconductor).

The first image pickup section 11-1 and the second image pickup section 11-2 are respectively moved according to movement of the head section.

The third image pickup section 21-1 and the fourth image pickup section 21-2 are respectively moved according to respective movements of the first manipulator MNP1 and the second manipulator MNP2.

The robot 1 includes a control device 51. In this embodiment, the robot 1 includes the control device 51 on the inside of the base section.

The control device 51 controls the operation of the robot 1. The control device 51 controls, for example, the operations of the first manipulator MNP1 and the second manipulator MNP2. Further, in a configuration in which the operation of a portion such as the waist of the robot 1 is possible, the control device 51 controls the operation of the portion such as the waist.

In this embodiment, each of the first image pickup section 11-1, the second image pickup section 11-2, the third image pickup section 21-1, and the fourth image pickup section 21-2 picks up an image and transmits (outputs) information concerning the picked-up image to the control device 51. Each of the first force sensor 31-1 and the second force sensor 31-2 detects a force and a moment acting on each of the first end effector END1 and the second end effector END2 and outputs information concerning a detection result to the control device 51. The control device 51 can receive (input) these kinds of information and use the received information in controlling the operation of the robot 1.

Each of the first image pickup section 11-1, the second image pickup section 11-2, the third image pickup section 21-1, the fourth image pickup section 21-2, the first force sensor 31-1, and the second force sensor 31-2 and the control device 51 are connected via a line and is capable of communicating information via the line.

In this embodiment, calibration of a coordinate system is performed concerning the position and the posture of the first manipulator MNP1, the position and the posture of the second manipulator MNP2, and images picked up by the image pickup sections (the first image pickup section 11-1, the second image pickup section 11-2, the third image pickup section 21-1, and the fourth image pickup section 21-2).

In this embodiment, the control device 51 controls the operation of the robot 1 according to an operation control program set in advance. The control device 51 teaches the robot 1 (a main body) about various kinds of information necessary for realizing the operation of the robot 1.

As a specific example, by controlling the operations of the manipulators (the first manipulator MNP1 and the second manipulator MNP2), the control device 51 is capable of, for example, gripping an object with the end effectors (the first end effector END1 and the second end effector END2), moving the object gripped by the end effectors, placing the object gripped by the end effectors in a predetermined position and release the object (release the grip), and machining (e.g., boring) the object gripped by the end effectors.

In this embodiment, the control device 51 is included in the inside of the robot 1. However, as another configuration example, the control device 51 may be provided separately from the robot 1. In this configuration, the control device 51 and the robot 1 are connected by a wired cable or radio.

Figure 2:
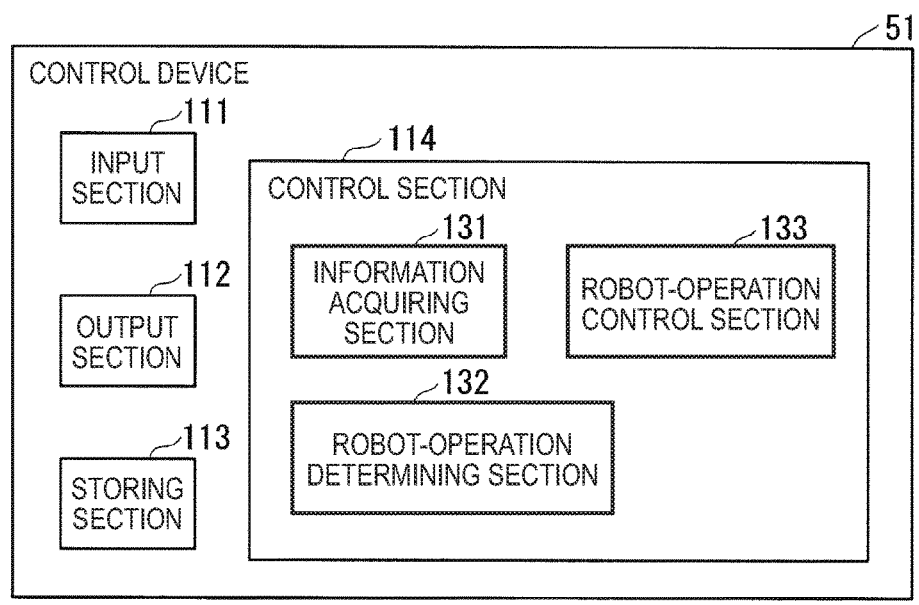
FIG. 2 is a block diagram showing a schematic configuration example of a control device according to the embodiment of the invention.

FIG. 2 is a block diagram showing a schematic configuration example of the control device 51 according to the embodiment of the invention.

The control device 51 includes an input section 111, an output section 112, a storing section 113, and a control section 114. The control section 114 includes an information acquiring section 131, a robot-operation determining section 132, and a robot-operation control section 133.

The input section 111 inputs information received from the outside. For example, the input section 111 may include an operation section operated by a user. The input section 111 may input information corresponding to operation of the operation section or may input information output from an external device. For example, the input section 111 may input information concerning images (picked-up images) output from the image pickup sections (the first image pickup section 11-1, the second image pickup section 11-2, the third image pickup section 21-1, and the fourth image pickup section 21-2) and input information concerning detection results output from the input sensors (the first force sensor 31-1 and the second force sensor 31-2).

The output section 112 outputs information to the outside. For example, the output section 112 may include a display screen. The output section 112 may output the information to the display screen and output the information to an external device. For example, the output section 112 may output information for giving instructions of operation to the image pickup sections (the first image pickup section 11-1, the second image pickup section 11-2, the third image pickup section 21-1, and the fourth image pickup section 21-2) or may output information for giving instructions of operation to the force sensors (the first force sensor 31-1 and the second force sensor 31-2).

The storing section 113 stores information. For example, the storing section 113 stores operation control programs, various parameters, and the like.

The control section 114 performs various kinds of control concerning the robot 1. For example, the control section 114 includes a processor such as a CPU (Central Processing Unit) and performs various kinds of control by executing the operation control programs stored in the storing section 113.

The information storing section 131 acquires information. For example, the information acquiring section 131 is capable of acquiring the information input by the input section 111 and acquiring the information stored by the storing section 113. The information acquiring section 131 is capable of acquiring, for example, the information concerning the images (the picked-up images) output from the image pickup sections (the first image pickup section 11-1, the second image pickup section 11-2, the third image pickup section 21-1, and the fourth image pickup section 21-2) and the information concerning the detection results output from the force sensors (the first force sensor 31-1 and the second force sensor 31-2). The information acquiring section 131 is capable of acquiring, for example, information such as the parameters stored in the storing section 113.

The robot-operation determining section 132 determines operation (robot operation) performed by the robot 1. In this case, the robot-operation determining section 132 may determine, on the basis of the information acquired by the information acquiring section 131, the operation performed by the robot 1.

The robot-operation control section 133 controls the operation of the robot 1 to realize the robot operation determined by the robot-operation determining section 132.

In this embodiment, the double-arm robot including the two arms is used. However, as another configuration example, a single-arm robot including one arm may be used. A plurality of single-arm robots may be used. For example, the robot may be a parallel link robot, may be an orthogonal axis robot, may be a single axis robot, or may be a SCARA robot.

Examples of the Box Material and the Box

Figure 3:
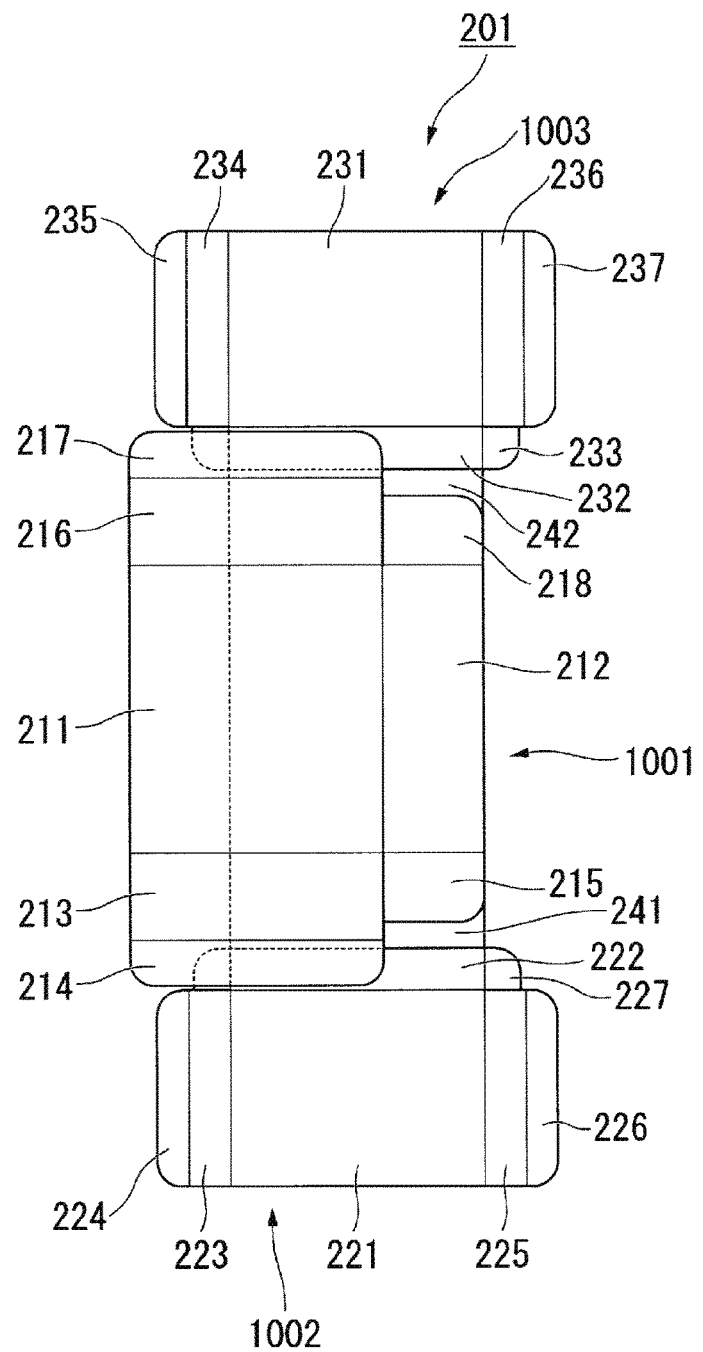
FIG. 3 is a diagram showing an example of a box material before assembling according to the embodiment of the invention.

FIG. 3 is a diagram showing an example of a box material 201 before assembly according to the embodiment of the invention. In the example shown in FIG. 3, the box material 201 is in a state in which the box material 201 is folded up in a substantially plane state.

Figure 4:
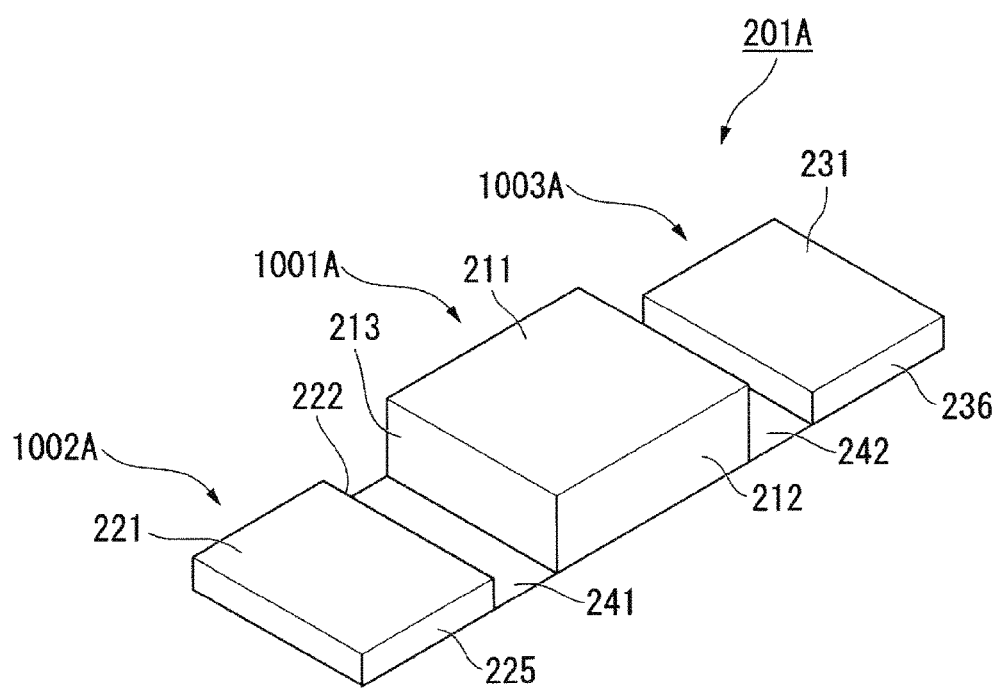
FIG. 4 is a diagram showing an example of a completed box according to the embodiment of the invention.

FIG. 4 is a diagram showing an example of a completed box 201A according to the embodiment of the invention. The box 201A is a box generated by folding the box material 201.

The box material 201 shown in FIG. 3 includes a first box material section 1001, a second box material section 1002, a third box material section 1003, a tabular first connecting section 241 that connects the first box material section 1001 and the second box material section 1002, and a tabular second connecting section 242 that connects the first box material section 1001 and the third box material section 1003.

A first box 1001A is generated from the first box material section 1001, a second box 1002A is generated from the second box material section 1002, and a third box 1003A is generated from the third box material section 1003. One surface of the first box 1001A and one surface of the second box 1002A are connected via the first connecting section 241. The one surface of the first box 1001A and one surface of the third box 1003A are connected via the second connecting section 242.

The first box material section 1001 has a shape including a tubular body and insertion-type lids respectively provided in two opening sections of the tubular body. The first box material section 1001 is a kind of a so-called caramel box.

The tubular body includes four tabular surfaces. The four tabular surfaces are connected to form the tubular shape. When the four tabular surfaces are referred to as first surface, second surface, third surface, and fourth surface in the order of the connection, the first surface and the third surface are opposed to each other and the second surface and the fourth surface are opposed to each other in the completed first box 1001A. The first surface and the third surface have the same shape. The second surface and the fourth surface have the same shape. In this embodiment, the first surface and the third surface are a square. The second surface and the fourth surface are a rectangle having sides as long as one side of the square and sides longer than the sides.

The insertion-type lid includes a tabular surface connected to the first surface in each of the opening sections. The surface is a kind of a so-called tuck. The surface is configured by connecting one surface close to the first surface and another one surface far from the first surface. The one surface close to the first surface has a shape substantially the same as the shape of the opening section. The other one surface far from the first surface is small compared with the one surface close to the first surface.

The insertion-type lid includes, in each of the opening sections, tabular surfaces (two surfaces in total for one opening section) respectively connected to the second surface and the fourth surface. The surfaces are a kind of a so-called flap.

In the example shown in FIG. 3, an exterior view on one surface side of the folded-up box material 201 is shown. In the example shown in FIG. 3, surfaces 211, 212, 213, 214, 215, 216, 217, and 218 are shown as components of the first box material section 1001. For example, the surface 211 is the first surface, the surface 212 is the second surface, the surface 213 and the surface 214 are a tuck, the surface 215 is a flap, the surface 216 and the surface 217 are a tuck, and the surface 218 is a flap.

Note that an exterior view on the other surface (opposite surface) side of the folded-up box material 201 is not shown. However, the box material 201 includes the surfaces as explained above about the first material box section 1001 according to this embodiment.

Like the first box material section 1001, the second box material section 1002 has a shape including a tubular body and insertion-type lids respectively provided in two opening sections of the tubular body. The second box material section 1002 is a kind of a so-called caramel box.

Compared with the first box material section 1001, the second box material section 1002 has a shape same as the shape of the first box material section 1001 except that the entire size is small and a surface equivalent to the first surface is a rectangle. In the second box material section 1002, tucks are provided in short sides in the rectangular surface equivalent to the first surface and formed as opening sections. In this embodiment, the length of a long side in the rectangular surface equivalent to the first surface in the second box material section 1002 is equal to the length of one side of the square first surface in the first box material section 1001.

In the example shown in FIG. 3, an exterior view on one surface side of the folded-up box material 201 is shown. In the example shown in FIG. 3, surfaces 221, 222, 223, 224, 225, 226, and 227 are shown as components of the second box material section 1002. For example, the surface 223 and the surface 224 are a tuck, the surfaces 225 and the surface 226 are a tuck, and the surface 227 is a flap.

Note that an exterior view on the other surface (opposite surface) side of the folded-up box material 201 is not shown in the figure. However, the box material 201 includes the surfaces as explained above about the second box material section 1002 according to this embodiment.

The third box material section 1003 has a shape same as the shape of the second box material section 1002. That is, the third box material section 1003 has a shape including a tubular body and insertion-type lids respectively provided in two opening sections of the tubular body. The third box material section 1003 is a kind of a so-called caramel box.

In the example shown in FIG. 3, an exterior view on one surface side of the folded-up box material 201 is shown. In the example shown in FIG. 3, surfaces 231, 232, 233, 234, 235, 236, and 237 are shown as components of the third box material section 1003. For example, the surface 234 and the surface 235 are a tuck, the surface 236 and the surface 237 are a tuck, and the surface 233 is a flap.

Note that an exterior view on the other surface (opposite surface) side of the folded-up box material 201 is not shown. However, the box material 201 includes the surfaces as explained above about the third box material section 1003 according to this embodiment.

In the box material 201 according to this embodiment, a side on one opening section side of the third surface in the first box material section 1001 and a side on one non-opening section side of a surface equivalent to the third surface in the second box material section 1002 are connected via the first connecting section 241. In this embodiment, the first connecting section 241 is rectangular and has a shape same as the shape of one surface close to the first surface among the tucks in the first box material section 1001.

Note that the first connecting section 241 may be integral with, for example, one or both of the third surface in the first box material section 1001 and the surface equivalent to the third surface in the second box material section 1002.

Similarly, in the box material 201 according to this embodiment, a side on the other opening section side of the third surface in the first box material section 1001 and a side on one non-opening section side of a surface equivalent to the third surface in the third box material section 1003 are connected via the second connecting section 242. In this embodiment, the second connecting section 242 is rectangular and has a shape same as the shape of one surface close to the first surface among the tucks in the first box material section 1001.

Note that the second connecting section 242 may be integral with, for example, one or both of the third surface in the first box material section 1001 and the surface equivalent to the third surface in the third box material section 1003.

Note that a hole, a cutout, or the like may be provided on any surface in the box material 201 according to necessity.

Example of the Jig

Figure 5:
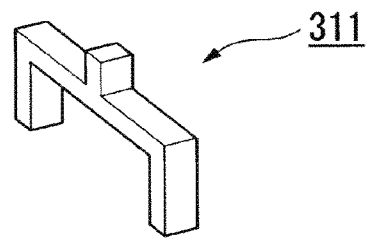
FIG. 5 is a diagram showing an example of a jig (a first jig) according to the embodiment of the invention.

FIG. 5 is a diagram showing an example of the jig (a first jig 311) according to the embodiment of the invention.

The first jig 311 has a shape in which a surface having substantially the same shape has thickness. The surface having substantially the same shape is configured from a rectangular portion, portions protruding from respective both ends of a long side of the rectangle in the same direction orthogonal to the long side (two protruding portions at both the ends), and a portion protruding from the center of the long side of the rectangle in a direction, which is opposite to direction of the protruding portions at both the ends, orthogonal to the long side (one protruding portion in the center). In this embodiment, the one protruding portion in the center is gripped by the robot 1.

Figure 6:
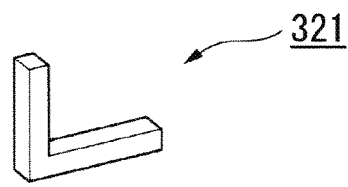
FIG. 6 is a diagram showing an example of a jig (a second jig) according to the embodiment of the invention.

FIG. 6 is a diagram showing an example of the jig (a second jig 321) according to the embodiment of the invention.

The second jig 321 has a shape in which a surface having substantially the same shape has thickness. The surface having substantially the same shape is an L-shape surface. In this embodiment, one of two tabular surfaces orthogonal to each other of the L-shaped surface is gripped by the robot 1. Note that, in this embodiment, the lengths (lengths extending in directions orthogonal to each other) of the two tabular surfaces orthogonal to each other of the L-shaped surface are different. However, as another configuration example, the lengths may be the same.

Figure 7:
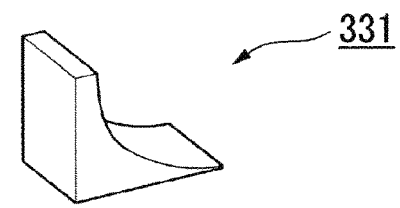
FIG. 7 is a diagram showing an example of a jig (a third jig) according to the embodiment of the invention.

FIG. 7 is a diagram showing an example of the jig (a third jig 331) according to the embodiment of the invention.

The third jig 331 has a shape in which a surface having substantially the same shape has thickness. The surface having substantially the same shape is a surface close to an L shape. However, an L-shaped concave section is formed as a curved surface. In this embodiment, one of two tabular surfaces orthogonal to each other of such a substantially L-shaped surface is gripped by the robot 1.

In this example, the third jig 331 has a shape like a slide including a guide plate portion and a slope portion.

Figure 8:
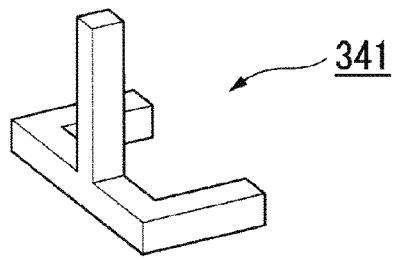
FIG. 8 is a diagram showing an example of a jig (a fourth jig) according to the embodiment of the invention.

FIG. 8 is a diagram showing an example of the jig (a fourth jig 341) according to the embodiment of the invention.

The fourth jig 341 has a shape in which a surface having substantially the same shape has thickness and includes a portion protruding from the surface in one direction of the thickness. The surface having substantially the same shape is configured from a rectangular portion and portions protruding from respective both ends of a long side of the rectangle in the same direction orthogonal to the long side (two protruding portions at both the ends). A portion protruding from the surface in one direction of the thickness is configured from a portion (one protruding portion in the center) protruding from the center of the long side of the rectangle. In this embodiment, the one protruding portion in the center is gripped by the robot 1.

Figure 9:
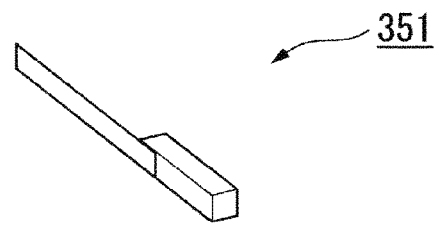
FIG. 9 is a diagram showing an example of a jig (a fifth jig) according to the embodiment of the invention.

FIG. 9 is a diagram showing an example of the jig (a fifth jig 351) according to the embodiment of the invention.

The fifth jig 351 includes a block-like portion having thickness and a rectangular portion connected to the block-like portion. The rectangular portion has a thin tabular shape and extends in the longitudinal direction of the rectangular shape from the block-like portion. In this embodiment, the block-like portion is gripped by the robot 1.

Explanation of a Principle of Work Performed by the Robot

A principle of work for moving, with the robot 1, the first box material section 1001 from a folded-up state to a raised state is explained with reference to FIGS. 10 to 13.

FIGS. 10, 11, 12, and 13 are respectively diagrams for explaining the principle of work for moving, with the robot 1, the first box material section 1001 from the folded-up state to the raised state.

Figure 10:
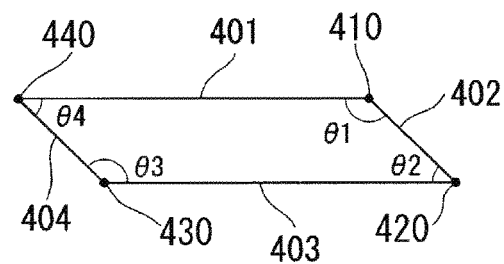
FIG. 10 is a diagram for explaining a principle of work for moving, with the robot according to the embodiment of the invention, a first box material section from a folded-up state to a raised state.
Figure 11:
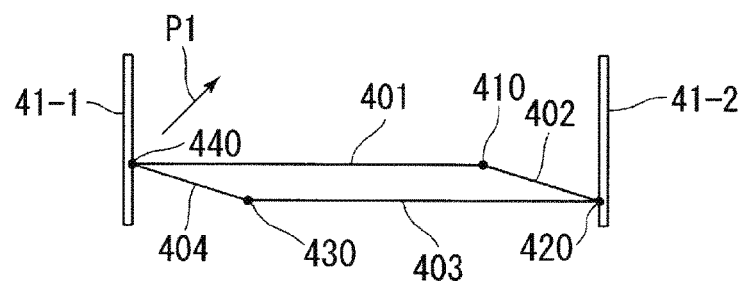
FIG. 11 is a diagram for explaining a principle of the work for moving, with the robot according to the embodiment of the invention, the first box material section from the folded-up state to the raised state.
Figure 12:
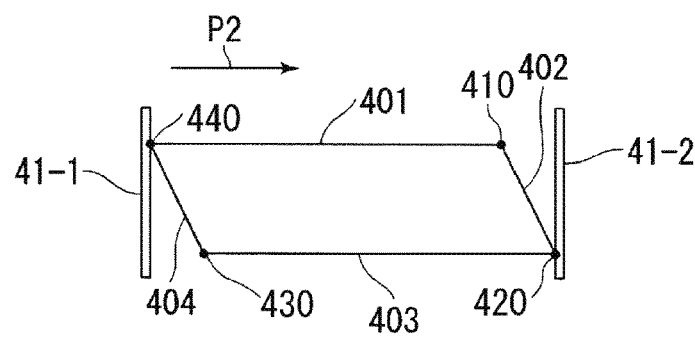
FIG. 12 is a diagram for explaining the principle of the work for moving, with the robot according to the embodiment of the invention, the first box material section from the folded-up state to the raised state.
Figure 13:
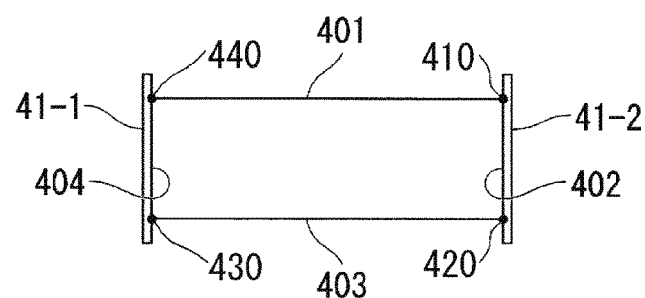
FIG. 13 is a diagram for explaining the principle of the work for moving, with the robot according to the embodiment of the invention, the first box material section from the folded-up state to the raised state.

FIGS. 10 to 13 show, concerning a first surface 401 (a first plate body), a second surface 402 (a second plate body), a third surface 403 (a third plate body), and a fourth surface 404 (a fourth plate body) of the first box material section 1001, a cross section perpendicular to the surfaces 401 to 404. In this example, the cross section is a parallelogram (which may be a rectangle or a square). FIGS. 11 to 13 show the same cross section concerning the first palm 41-1 and the second palm 41-2. In this example, a temporal flow of a process of work is shown in the order of FIG. 11 to FIG. 13.

In the explanation of FIGS. 10 to 13, whereas the third surface 403 is disposed on the lower surface, the first surface 401 is disposed on the upper surface and, whereas the fourth surface 404 is disposed on the left side, the second surface 402 is disposed on the right side.

A side (a first part) that connects (couples) the first surface 401 and the second surface 402 is referred to as first side 410. A side (a second part) that connects (couples) the second surface 402 and the third surface 403 is referred to as second side 420. A side (a third part) that connects (couples) the third surface 403 and the fourth surface 404 is referred to as third side 430. A side (a fourth part) that connects (couples) the fourth surface 404 and the first surface 401 is referred to as fourth side 440.

An angle formed by the first surface 401 and the second surface 402 is referred to as first angle θ1. An angle formed by the second surface 402 and the third surface 403 is referred to as second angle θ2. An angle formed by the third surface 403 and the fourth surface 404 is referred to as third angle θ3. An angle formed by the fourth surface 404 and the first surface 401 is referred to as fourth angle θ4.

Note that, in FIGS. 10 to 13, components other than the first surface 401, the second surface 402, the third surface 403, and the fourth surface 404 and the first side 410, the second side 420, the third side 430, and the fourth side 440 of the first box material section 1001 are not shown.

In FIG. 10, a state close to a state in which the first box material section 1001 is folded up is shown.

In a state in which the first box material section 1001 is completely folded, the first angle θ1 and the third angle θ3 are 180 degrees (or approximately 180 degrees) and the second angle θ2 and the fourth angle θ4 are 0 degree (or approximately 0 degree). In FIG. 10, a state is shown in which the first box material section 1001 is slightly raised.

In this example, it is assumed that the third surface 403 of the first box material section 1001 is fixed not to move.

In FIG. 11, a state is shown in which the robot 1 sets the first palm 41-1 and the second palm 41-2 in contact with (limit-stops the first palm 41-1 and the second palm 41-2 in) the first box material section 1001.

In this example, the first palm 41-1 is set in contact with the fourth side 440 and the second palm 41-2 is set in contact with the second side 420. The robot 1 moves the first palm 41-1 in a predetermined direction P1 while keeping the position and the posture of the second palm 41-2 fixed. The predetermined direction P1 is a direction extending obliquely upward (in FIG. 11, an obliquely right upward direction) from the first palm 41-1 to the side of the first box material section 1001. Consequently, the first box material section 1001 rises with a frictional force. Specifically, the distance (the distance in the perpendicular direction) between the first surface 401 and the third surface 403 increases, the first angle θ1 and the third angle θ3 decrease, and the second angle θ2 and the fourth angle θ4 increase.

In FIG. 12, a state is shown in which the first box material section 1001 further rises than the state shown in FIG. 11.

The robot 1 moves the first palm 41-1 in a predetermined direction P2 while keeping the position and the posture of the second palm 41-2 fixed. The predetermined direction P2 is a direction extending substantially horizontally (in FIG. 12, a substantially right direction) from the first palm 41-1 to the side of the first box material section 1001. Consequently, the first box material section 1001 further rises with the frictional force. The first angle θ1, the second angle θ2, the third angle θ3, and the fourth angle θ4 approach 90 degrees.

In FIG. 13, a state is shown in which the first box material section 1001 completely rises.

The surface of the first palm 41-1 of the robot 1 and the fourth surface 404 are in contact in parallel and the second palm 41-2 of the robot 1 and the second surface 402 are in contact in parallel. The first angle θ1, the second angle θ2, the third angle θ3, and the fourth angle θ4 are 90 degrees.

In the example shown in FIGS. 11 to 13, the magnitude and the direction of a force applied to the second palm 41-2 by the robot 1 may be decided in advance, for example, according to an experiment or a theory. Any form may be used as the magnitude and the direction. As an example, a form in which the magnitude or the direction of the force continuously changes may be used. Alternatively, a form in which the magnitude or the direction of the force discretely changes may be used.

A principle of work for creasing the tuck (the surface 405 and the surface 406) of the first box material section 1001 with the robot 1 using the second jig 321 is explained with reference to FIG. 14.

Figure 14:
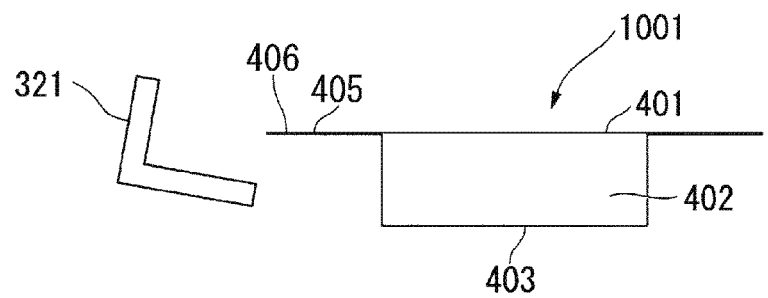
FIG. 14 is a diagram for explaining a principle of work for creasing a tuck of the first box material section using a jig with the robot according to the embodiment of the invention.

FIG. 14 is a diagram for explaining the principle of work for creasing the tuck (the surface 405 and the surface 406) of the first box material section 1001 with the robot 1 using the second jig 321. FIG. 14 shows a state in which the first box material section 1001 is viewed perpendicularly to the second surface 402 from the outer side of the second surface 402 in a state in which at least the first surface 401, the second surface 402, the third surface 403, and the fourth surface 404 are completely raised as shown in FIG. 13.

Note that, in FIG. 14, a schematic shape of the first box material section 1001 and the tuck are shown. The other components are not shown.

The robot 1 grips an end of one surface of the L-shaped second jig 321 with the claws of the first end effector END1, brings the one surface or the other surface of the L-shaped second jig 321 into contact with the tuck, and creases the tuck. At this point, the robot 1 creases the tuck in a state in which, on the basis of a direction in which the one surface of the L-shaped second jig 321 is perpendicular to the first surface 401, a gripped portion (the end of the one surface) is lightly tilted in a direction in which the gripped portion approaches the first surface 401.

The robot 1 is capable of adjusting speed or a direction of movement of the tuck according to the magnitude or the direction of a force applied to the second jig 321.

For example, the robot 1 bends the surface 405 of the tuck to the upper side with respect to the first surface 401 by bending a side that connects the surface 405 of the tuck and the first surface 401. The robot 1 bends the surface 406 of the tuck to the lower side with respect to the surface 405 by bending a side that connects the surface 405 of the tuck and the surface 406.

Explanation of Work Performed by the Robot

Work (first work to third work) performed by the robot 1 is explained below.

Respective kinds of processing explained below are performed by the robot 1 according to the control of the robot 1 by the control device 51. The robot 1 is capable of using the first manipulator MNP1 and the first end effector END1 and using the second manipulator MNP2 and the second end effector END2. The control device 51 may use, for the control of the robot 1, for example, image information output from the image pickup sections (the first image pickup section 11-1, the second image pickup section 11-2, the third image pickup section 21-1, the fourth image pickup section 21-2) or detection information output from the force sensors (the first force sensor 31-1 and the second force sensor 31-2). For example, in the respective kinds of processing, the control device 51 may perform position control on the basis of the image information, may perform force control on the basis of the detection information of a force, or may perform these kinds of control in combination.

In this example, the control device 51 performs processing of the work (the first work to the third work) by executing an operation control program set in advance.

Note that, in the robot 1 according to this embodiment, the configuration on one arm side (the first manipulator MNP1 and the first end effector END1) and the configuration on the other arm side (the second manipulator MNP2 and the second end effector END2) are the same. Therefore, the arm side on the opposite side may be used instead of the one arm side or the other arm side illustrated in this embodiment.

When the operation control program for performing the processing of the work for assembling the box material 201 is designed, the size, the material, or the like of the box material 201 may be taken into account.

Explanation of the First Work Performed by the Robot

The first work performed by the robot 1 is explained with reference to FIGS. 15 to 28.

Figure 15:
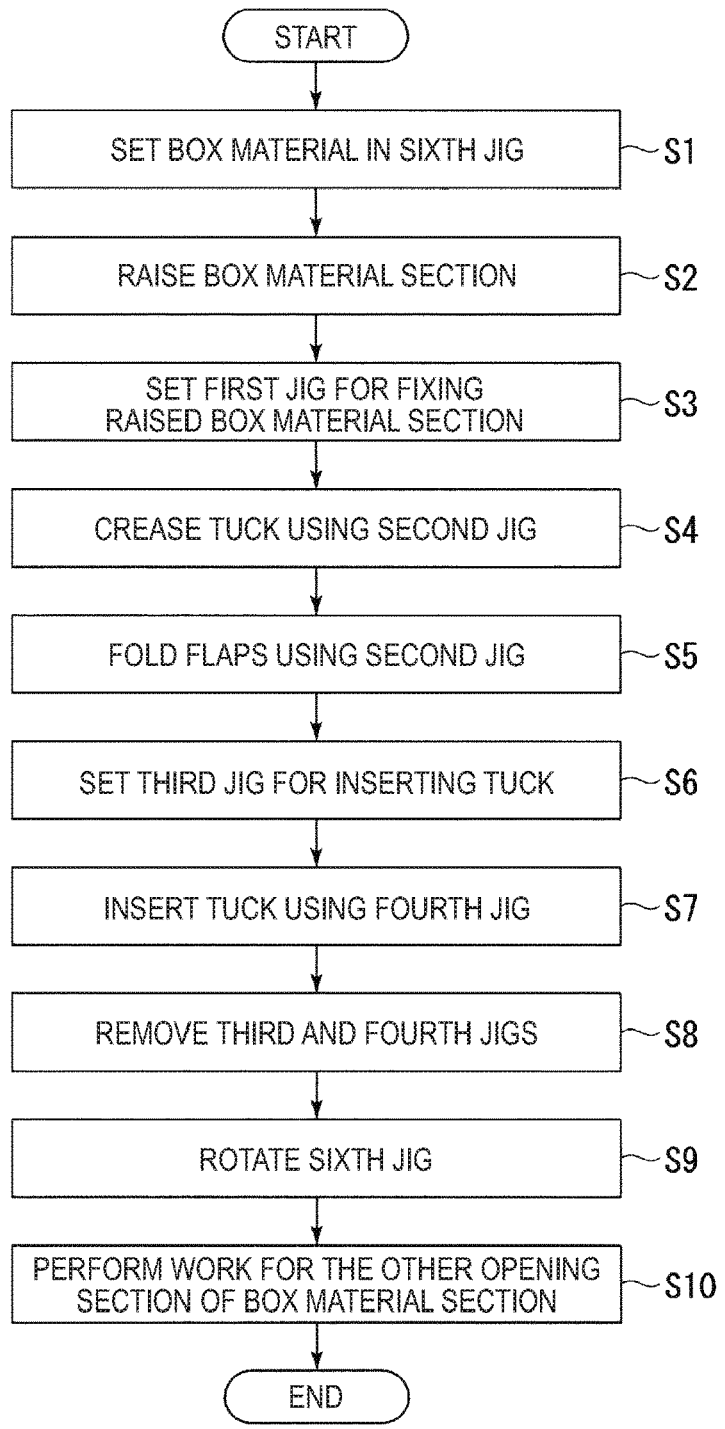
FIG. 15 is a diagram showing an example of a procedure of processing of work (first work) performed by the robot according to the embodiment of the invention.

FIG. 15 is a diagram showing an example of a procedure of processing of the work (the first work) performed by the robot 1 according to the embodiment of the invention.

Figure 16:
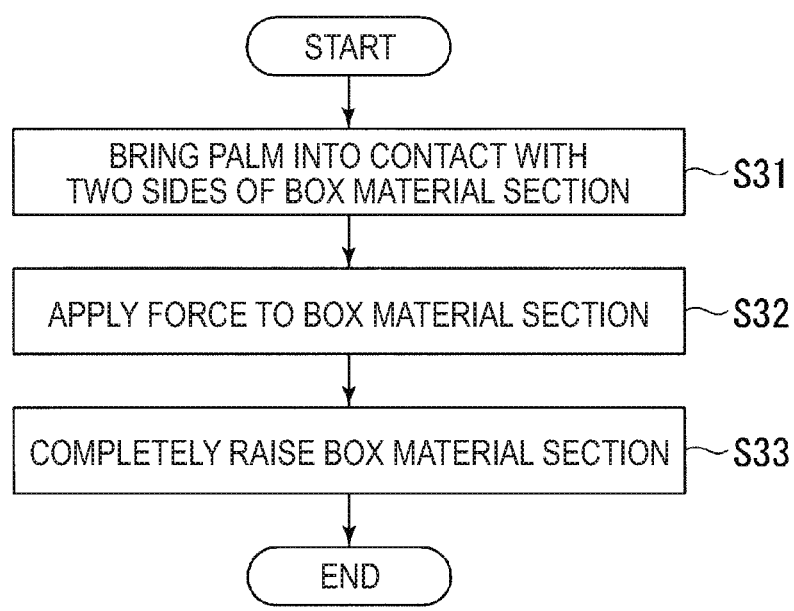
FIG. 16 is a diagram showing an example of a procedure of processing of work (standing of a box material in the first work) performed by the robot according to the embodiment of the invention.

FIG. 16 is a diagram showing an example of a procedure of processing of work (standing of the box material in the first work) performed by the robot 1 according to the embodiment of the invention.

FIGS. 17 to 28 are respectively diagrams showing a process of the work (the first work) performed by the robot 1 according to the embodiment of the invention. In this example, a temporal flow of the process of the first work is shown in the order from FIG. 17 to FIG. 28.

The first work is work for assembling the first box material section 1001.

In the first work, the first box material section 1001 of the box material 201 shown in FIG. 3 is assembled. In FIGS. 17 to 28, in order to clearly show the figures, only the components of the first box material section 1001 are shown concerning the box material 201. A part or all of the manipulators (the first manipulator MNP1 and the second manipulator MNP2) and the end effectors (the first end effector END1 and the second end effector END2) are sometimes not shown. In FIGS. 17 to 28, in order to clearly show the figures, a part or all of the other objects (e.g., the jig) or the reference numerals and signs in a work region where work on the box material 201 is performed are sometimes not shown.

In FIGS. 17 to 28, reference numerals and signs same as the reference numerals and signs shown in FIG. 1 and FIGS. 5 to 14 are used. For example, as reference numerals of the surfaces of the first box material section 1001, reference numerals different from the reference numerals shown in FIGS. 3 and 4 are used. However, since the surfaces have the same shape, the surfaces disposed the same correspond to one another.

The work is explained below in the order of processing in steps S1 to S10 shown in FIG. 15.

Details of the processing in step S2 shown in FIG. 15 are equivalent to processing in steps S31 to S33 shown in FIG. 16. Therefore, in the explanation of the processing in step S2, the processing in steps S31 to S33 is explained.

Step S1

The robot 1 sets the box material 201 in a sixth jig 1011. In an initial state, as shown in FIG. 3, the box material 201 is in a completely folded-up state and placed in the work region of the robot 1. The robot 1 grips the box material 201 with the claws of the first end effector END1 (or the claws of the second end effector END2), moves the box material 201, and sets the box material 201 in the sixth jig 1011. The robot 1 releases the gripping of the box material 201.

In this example, the box material 201 is fixed to the sixth jig 1011 and prevented from deviating because of work by the robot 1.

In this example, the sixth jig 1011 is a table. In this example, the third surface 403 of the first box material section 1001 or connecting sections of the first box material section 1001 (a connecting section of the first box material section 1001 and the second box material section 1002 and a connecting section of the first box material section 1001 and the third box material section 1003) are placed on a stand of the table in parallel and fixed.

As a method of fixing the box material 201 on the table, any method may be used. For example, a method of attracting the box material 201 with an attracting mechanism provided in the stand of the table or a method of fastening, with the robot 1 or manually, the stand of the table and the box material 201 using a clip or the like.

Step S2

The robot 1 raises the first box material section 1001.

The processing in steps S31 to S33, which is the details of the processing in step S2, is explained. A principle of the processing is as explained with reference to FIGS. 10 to 13.

Step S31

The robot 1 brings the palms (the first palm 41-1 and the second palm 41-2) into contact with two sides of the first box material section 1001.

Figure 17:
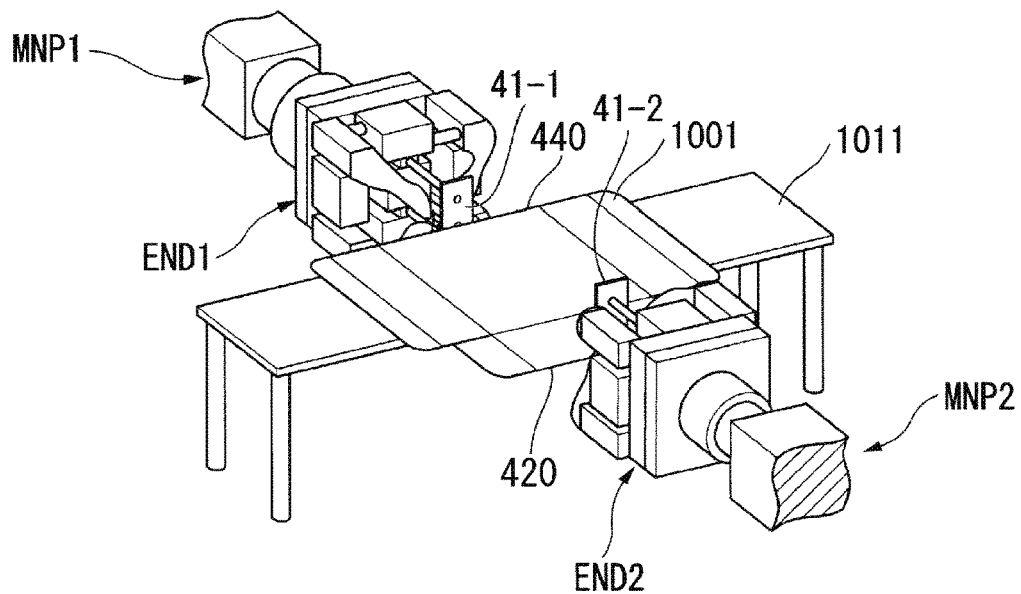
FIG. 17 is a diagram showing a process of the work (the first work) performed by the robot according to the embodiment of the invention.

Specifically, as shown in FIG. 17, the robot 1 moves the manipulators (the first manipulator MNP1 and the second manipulator MNP2) or the palms (the first palm 41-1 and the second palm 41-2), brings the surface of the first palm 41-1 into contact with the fourth side 440 of the first box material section 1001, and brings the surface of the second palm 41-2 into contact with the second side 420 of the first box material section 1001.

Step S32

The robot 1 applies a force to the first box material section 1001.

Figure 18:
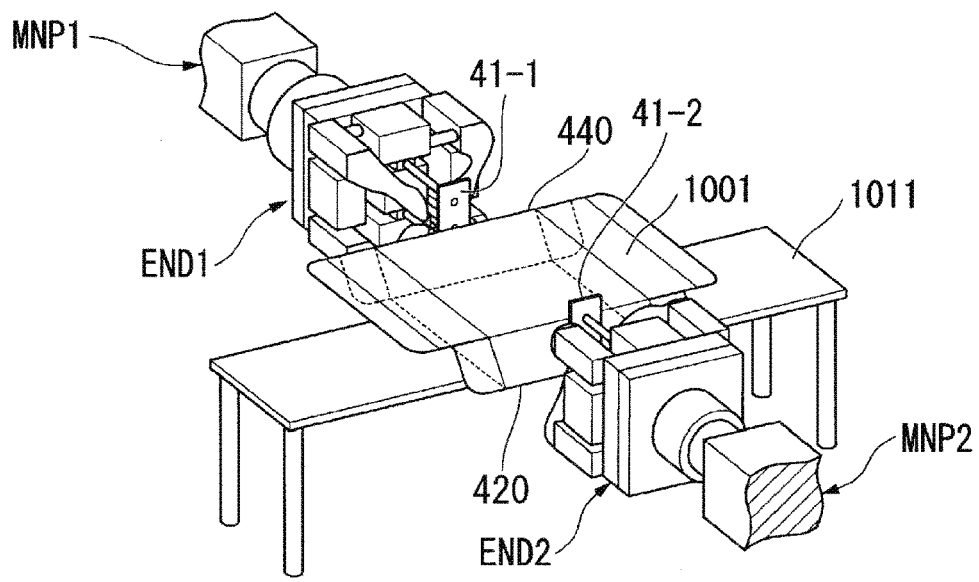
FIG. 18 is a diagram showing the process of the work (the first work) performed by the robot according to the embodiment of the invention.

Specifically, as shown in FIG. 18, the robot 1 applies, while keeping the position and the posture of the second palm 41-2 fixed, to the first palm 41-1, a force in a direction in which the portions of the first surface 401 to the fourth surface 404 of the first box material section 1001 rise. Consequently, the force is applied to the first box material section 1001. The portions gradually rise. Note that the direction of the force (alternatively, for example, a distance for moving the first palm 41-1 by applying the force) may be calculated by calculation or the like on the basis of, for example, the size of the first box material section 1001.

Step S33

The robot 1 completely raises the first box material section 1001.

Figure 19:
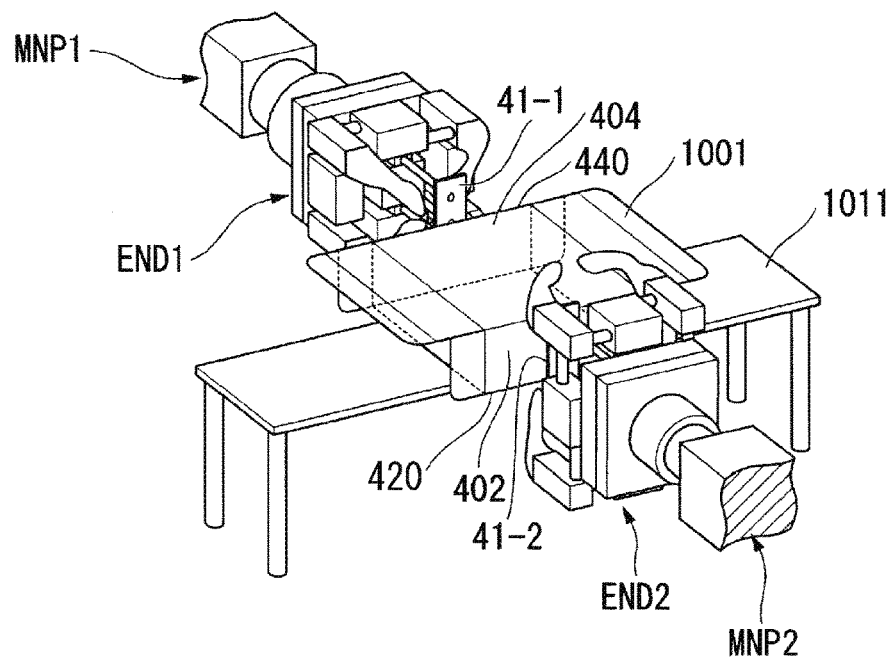
FIG. 19 is a diagram showing the process of the work (the first work) performed by the robot according to the embodiment of the invention.

Specifically, as shown in FIG. 19, the surface of the first palm 41-1 of the robot 1 is in contact with the fourth surface 404 of the first box material section 1001 in parallel and the surface of the second palm 41-2 of the robot 1 is in contact with the second surface 402 of the first box material section 1001 in parallel.

Step S3

The robot 1 sets the first jig 311 for fixing the raised first box material section 1001.

Figure 20:
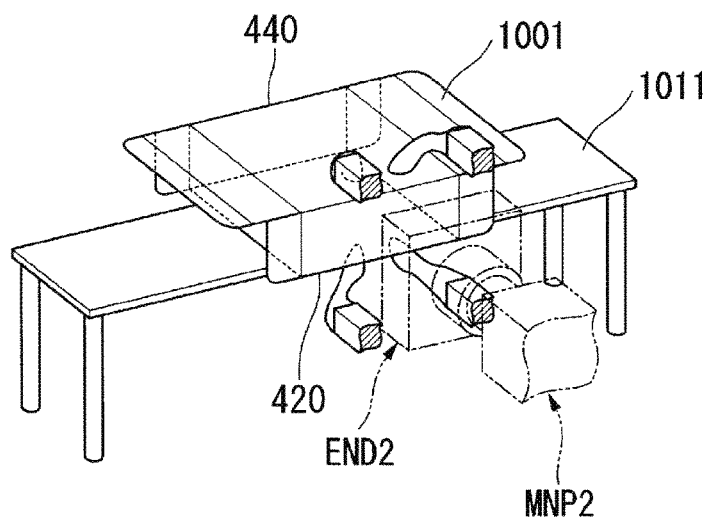
FIG. 20 is a diagram showing the process of the work (the first work) performed by the robot according to the embodiment of the invention.

Specifically, first, as shown in FIG. 20, the robot 1 grips the first surface 401 and the third surface 403 of the first box material section 1001 with the claws of the second end effector END2. Thereafter, the robot 1 retracts the portion of the second palm 41-2 to separate the second palm 41-2 from the second side 420. At the same time, the robot 1 retracts the portion of the first palm 41-1 to separate the first palm 41-1 from the fourth side 440. The robot 1 grips the first jig 311 with the claws of the first end effector END1. In the initial state, the first jig 311 is placed in the work region of the robot 1.

Figure 21:
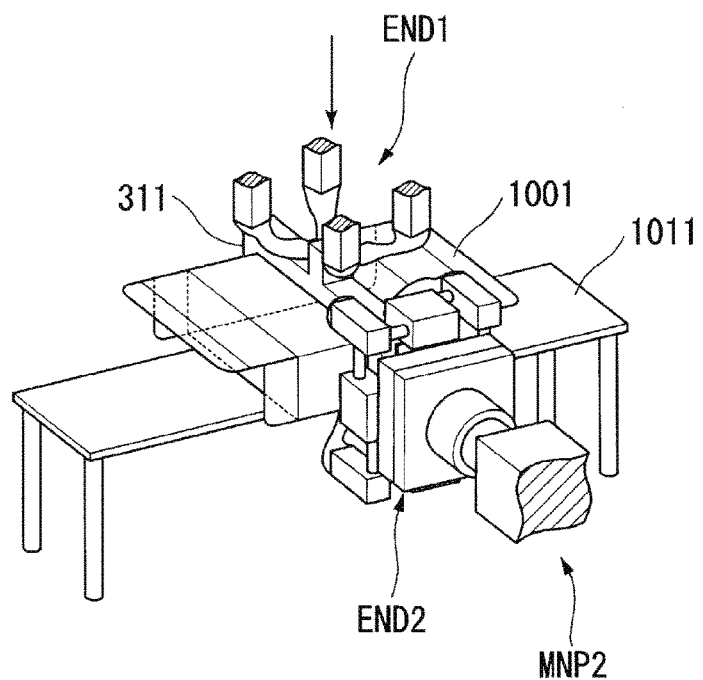
FIG. 21 is a diagram showing the process of the work (the first work) performed by the robot according to the embodiment of the invention.

Subsequently, as shown in FIG. 21, the robot 1 puts the first jig 311 over the first surface 401 of the first box material section 1001 from the upper side and presses the first jig 311 against the first surface 401 to fix the raised portion of the first box material section 1001 with the first jig 311.

Thereafter, the robot 1 releases the gripping of the first box material section 1001 by the claws of the second end effector END2.

In this example, the robot 1 grips the protruding portion in the center of the first jig 311 and holds the raised first surface 401, second surface 402, and fourth surface 404 with the protruding portions at both the ends of the first jig 311. Consequently, the surfaces on the inner sides of the protruding portions at both the ends of the first jig 311 come into contact with the second surface 402 and the fourth surface 404. The surface on the inner side between the protruding portions at both the ends of the first jig 311 comes into contact with the first surface 401. At this point, the robot 1 may perform force control on the basis of a detection result of the first force sensor 31-1. For example, when the force in the upward direction applied to the first jig 311 is equal to or larger than a predetermined threshold, the robot 1 may determine that the first jig 311 fits in the first box material section 1001.

Thereafter, the robot 1 may move the first jig 311 along the first surface 401 while keeping the first jig 311 in contact with the first surface 401.

In this example, the shape and the size of the first jig 311 are set according to the shape and the size of the first box material section 1001.

Step S4

The robot 1 creases the tuck of the first box material section 1001 using the second jig 321. A principle of this processing is as explained with reference to FIG. 14. A target to be creased is one tuck (the surface 405 and the surface 406) of the tucks in the two places.

Figure 22:
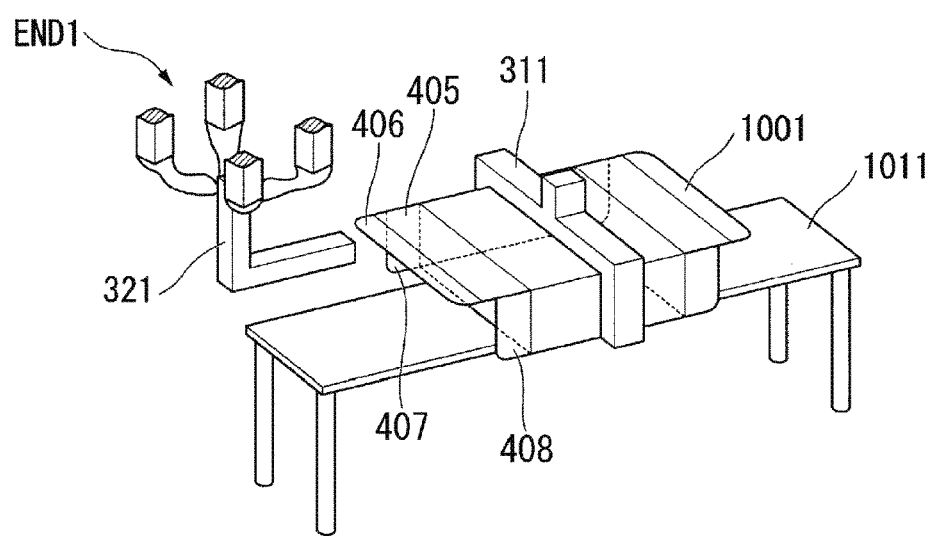
FIG. 22 is a diagram showing the process of the work (the first work) performed by the robot according to the embodiment of the invention.

Specifically, first, as shown in FIG. 22, the robot 1 grips the second jig 321 with the claws of the first end effector END1. In the initial state, the second jig 321 is placed in the work region of the robot 1. The robot 1 slightly tilts the L-shaped second jig 321 as shown in FIG. 14 and disposes the L-shaped second jig 321 in front of the tuck. At this point, the robot 1 disposes the L-shaped second jig 321 such that, with respect to one surface of the L-shaped second jig 321 to be gripped, the other surface extends in parallel to the first surface 401 and toward the opening section of the tuck.

In this example, length of the extension of the other surface of the L-shaped second jig 321 toward the opening section of the tuck is designed to be larger than the length (length in the same direction) of the tuck.

Figure 23:
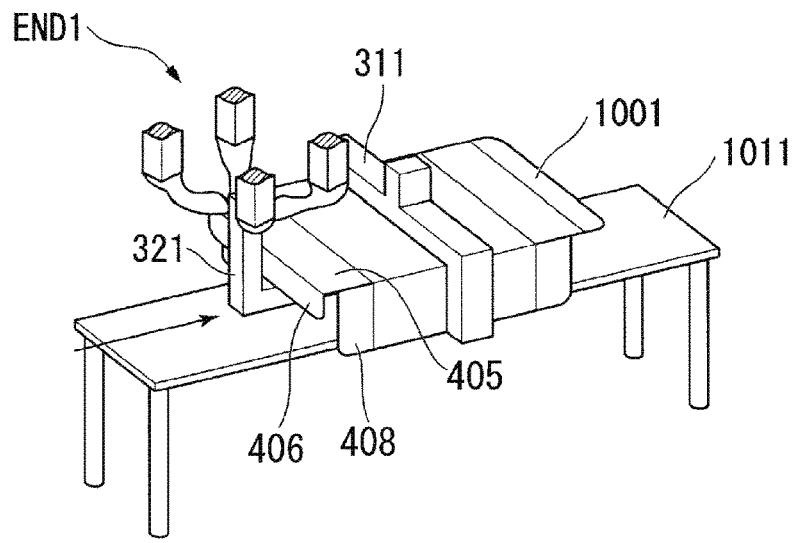
FIG. 23 is a diagram showing the process of the work (the first work) performed by the robot according to the embodiment of the invention.

Subsequently, as shown in FIG. 23, the robot 1 moves the second jig 321 to bring the one surface of the L-shaped second jig 321 close to the tuck. At this point, the robot 1 moves the second jig 321 in a direction along the first side 410 (and the second side 420, the third side 430, and the fourth side 440). Consequently, in a state in which the second jig 321 is in contact with the end of the surface 406 of the tuck, the surface 406 of the tuck is bent to the lower side with respect to the surface 405.

Figure 24:
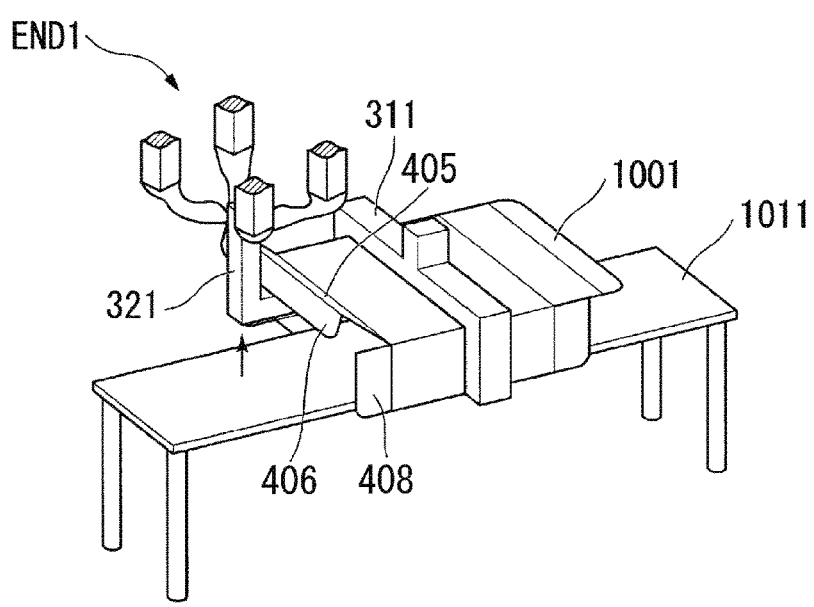
FIG. 24 is a diagram showing the process of the work (the first work) performed by the robot according to the embodiment of the invention.

Subsequently, as shown in FIG. 24, the robot 1 moves the second jig 321 to the upper side in a state in which a part of the other surface of the L-shaped second jig 321 enters the lower side of the surface 406 of the tuck. At this point, the robot 1 may move the second jig 321 to the upper side after moving the second jig 321 (i.e., eliminating the tilt) such that the one surface of the L-shaped second jig 321 becomes perpendicular to the first surface 401. Consequently, the surface 405 of the tuck is bent to the upper side with respect to the first surface 401.

Step S5

The robot 1 folds the flaps of the first box material section 1001 using the second jig 321. In this example, the robot 1 folds the flaps on both sides of the tuck directly using the second jig 321 used for creasing the tuck.

Figure 25:
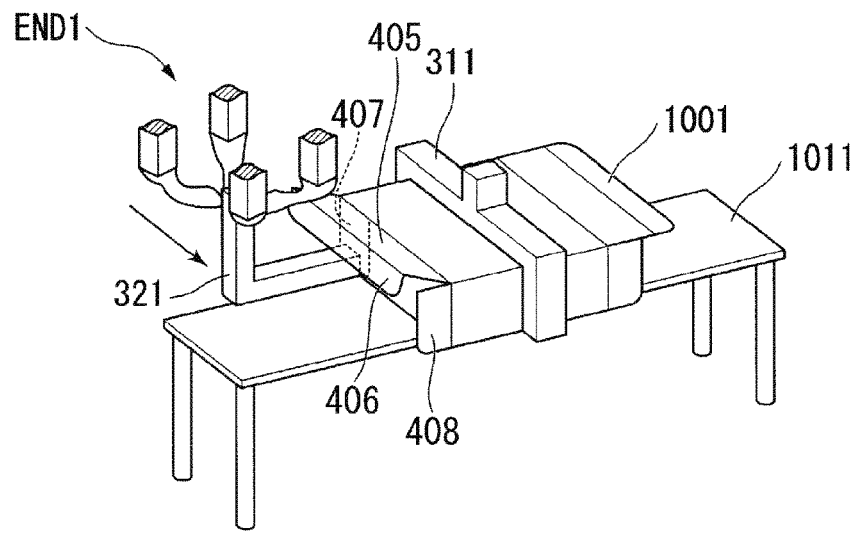
FIG. 25 is a diagram showing the process of the work (the first work) performed by the robot according to the embodiment of the invention.

Specifically, first, as shown in FIG. 25, while keeping gripping the second jig 321 with the claws of the first end effector END1, the robot 1 moves the first end effector END1 to press the surface 407 of one flap from the outer side toward the inner side of the first box material section 1001 with the second jig 321. At this point, the robot 1 moves the second jig 321 from the outer side toward the inner side of the first box material section 1001 in parallel to the surface (an imaginary surface) of the opening section in the place of the flap. Consequently, the surface 407 of the one flap is bent in parallel (or substantially parallel) to the surface (the imaginary surface) of the opening section.

Further, subsequently, while keeping gripping the second jig 321 with the claws of the first end effector END1, the robot 1 may move the first end effector END1 to press the bent surface 407 of the one flap from the outer side toward the inner side of the opening section with the second jig 321. Consequently, the surface 407 of the one flap is creased on the inner side of the opening section.

Subsequently, concerning the surface 408 of the other flap, similarly, while keeping gripping the second jig 321 with the claws of the first end effector END1, the robot 1 moves the first end effector END1 to press the surface 408 of the other flap from the outer side toward the inner side of the first box material section 1001 with the second jig 321. Consequently, the surface 408 of the other flap is bent in parallel (or substantially parallel) to the surface (an imaginary surface) of the opening section.

Further, subsequently, while keeping gripping the second jig 321 with the claws of the first end effector END1, the robot 1 may move the first end effector END1 to press the bent surface 408 of the other flap from the outer side toward the inner side of the opening section with the second jig 321. Consequently, the surface 408 of the other flap is creased on the inner side of the opening section.

In this example, since the robot 1 folds the flap in a state in which the tuck is creased on the upper side, it is possible to suppress the flap from interfering (colliding) with the tuck when the flap is folded.

Step S6

The robot 1 sets the third jig 331 for inserting the tuck. Note that the tuck is creased on the upper side by the processing explained above. The flaps on both sides are bent.

Figure 26:
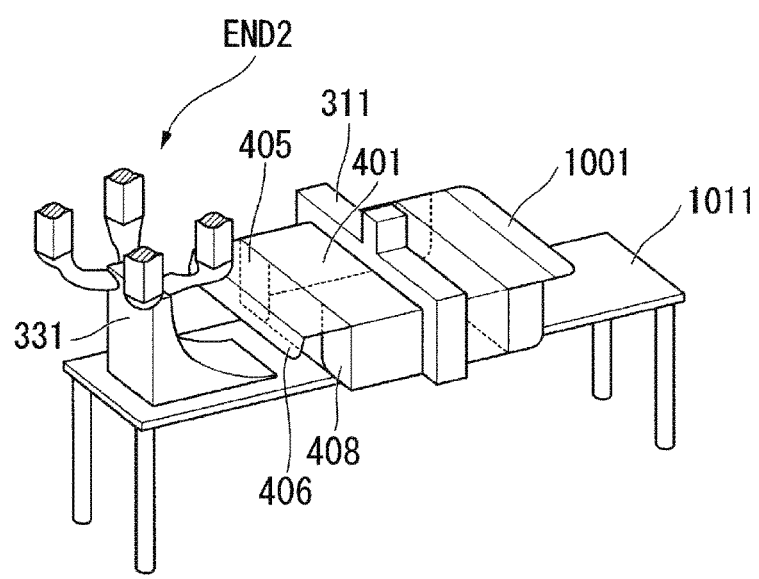
FIG. 26 is a diagram showing the process of the work (the first work) performed by the robot according to the embodiment of the invention.

Specifically, as shown in FIG. 26, the robot 1 grips the third jig 331 with the claws of the second end effector END2. In the initial state, the third jig 331 is placed in the work region of the robot 1. The robot 1 disposes the substantially L-shaped third jig 331 in front of the tuck. At this point, the robot 1 disposes the substantially L-shaped third jig 331 such that, with respect to one surface of the substantially L-shaped third jig 331 to be gripped, the other surface extends in parallel to the first surface 401 and toward the opening section of the tuck. Consequently, the curved surface of the L-shaped concave section of the third jig 331 is set to be opposed to the tuck and the opening section of the first box material section 1001.

The robot 1 releases the gripping of the third jig 331 by the claws of the second end effector END2.

Step S7

The robot 1 inserts the tuck using the fourth jig 341.

Figure 27:
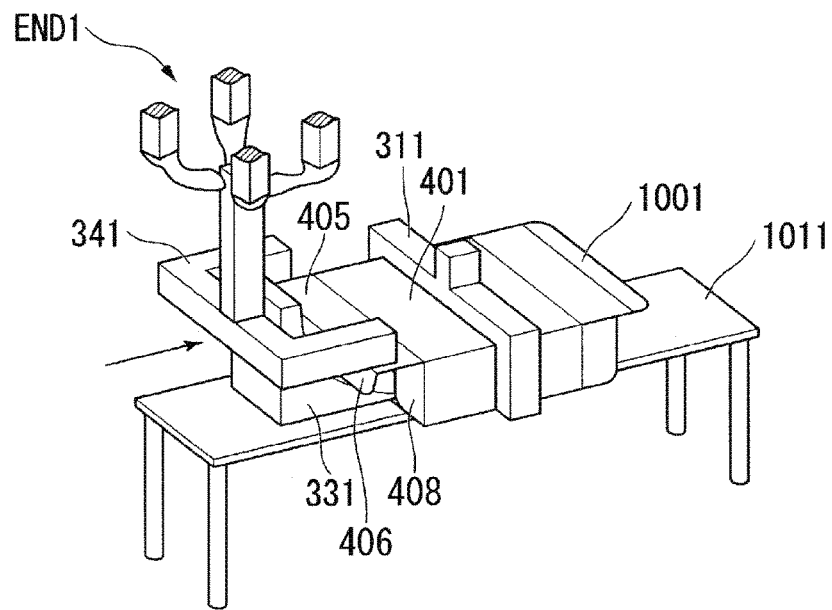
FIG. 27 is a diagram showing the process of the work (the first work) performed by the robot according to the embodiment of the invention.

Specifically, first, as shown in FIG. 27, the robot 1 grips the fourth jig 341 with the claws of the first end effector END1. In the initial state, the fourth jig 341 is placed in the work region of the robot 1. While keeping gripping the fourth jig 341 with the claws of the first end effector END1, the robot 1 moves the first end effector END1 to bring the fourth jig 341 into contact with the third jig 331.

In this example, the robot 1 grips the protruding portion in the center of the fourth jig 341 and holds one surface of the substantially L-shaped third jig 331 with the protruding portions at both the ends of the fourth jig 341. The one surface is a surface perpendicular to the first surface 401 of the first box material section 1001 and is a surface not opposed to the opening section. Consequently, the surface on the inner side between the protruding portions at both the ends of the fourth jig 341 comes into contact with the third jig 331.

In this example, the robot 1 disposes the fourth jig 341 such that the lower surface of the fourth jig 341 is parallel to the first surface 401 of the first box material section 1001 and the height of the lower surface is larger than the height of the first surface 401. In the example shown in FIG. 27, the heights are set substantially the same.

In this example, the shape and the size of the fourth jig 341 are set according to the shapes and the sizes of the third jig 331 and the first box material section 1001.

Subsequently, while keeping gripping the fourth jig 341 with the claws of the first end effector END1, the robot 1 moves the first end effector END1 and brings, with the fourth jig 341, the third jig 331 close to the opening section of the first box material section 1001. The robot 1 disposes the surfaces (the surfaces closest to the first box material section 1001 side) of the distal ends of the two protruding portions of the fourth jig 341 near the boundary between the first surface 401 and the surface 405 of the tuck. Thereafter, the robot 1 slightly moves the fourth jig 341 to the lower side while keeping the lower surface of the fourth jig 341 parallel to the first surface 401 of the first box material section 1001.

Figure 28:
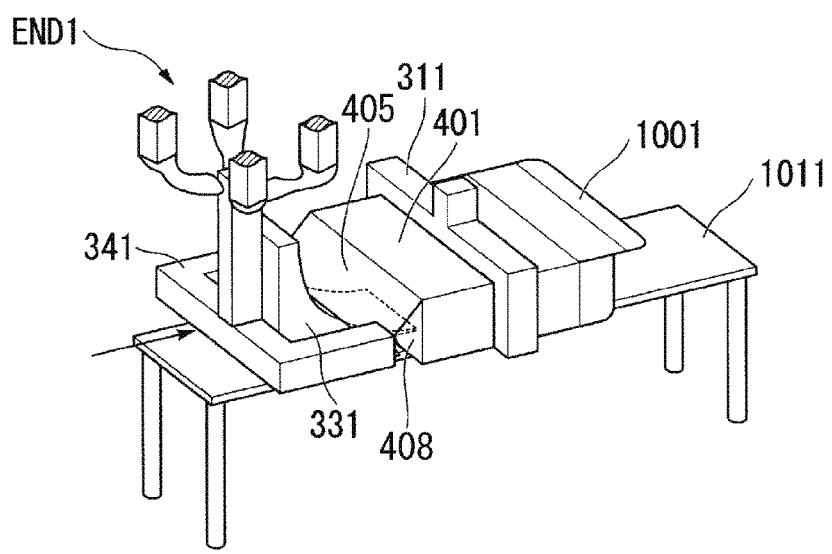
FIG. 28 is a diagram showing the process of the work (the first work) performed by the robot according to the embodiment of the invention.

Subsequently, as shown in FIG. 28, while keeping gripping the fourth jig 341 with the claws of the first end effector END1, the robot 1 moves the first end effector END1 and brings, with the fourth jig 341, the third jig 331 close to the opening section of the first box material section 1001. At this point, since the tuck is guided along the curved surface of the L-shaped concave section of the third jig 331, the tuck is smoothly inserted into the opening section of the first box material section 1001. Consequently, the surface 406 of the tuck is housed in the opening section of the first box material section 1001. The surface 405 of the tuck is completed as a surface covering the opening section (one surface of the rectangular parallelepiped first box 1001A).

Step S8

The robot 1 removes the third jig 331 and the fourth jig 341.

Specifically, the robot 1 places the fourth jig 341 in a position apart from the first box material section 1001 while keeping gripping the fourth jig 341 with the claws of the first end effector END1. The robot 1 grips the third jig 331 with the claws of the second end effector END2 and places the third jig 331 in a position apart from the first box material section 1001.

Note that, for example, the jigs (the first jig 311, the second jig 321, the third jig 331, and the fourth jig 341) may be returned to (placed in) the positions in the initial state or may be placed in other positions.

Step S9

One of the opening sections in the two places of the first box material section 1001 is completed with the tuck and the flap closed.

The robot 1 rotates the sixth jig 1011.

Specifically, the robot 1 rotates the sixth jig 1011 (in this example, the table) to replace the positions of the tuck and the flap for which the work has already been completed with the positions of the tuck and the flap for which work has not been performed yet. As a mechanism for the rotation, any mechanism may be used. For example, a mechanism for rotating only the portion of the stand of the table may be used or a mechanism for rotating the entire table may be used.

Note that, in this example, the mechanism for the rotation is included in the sixth jig 1011. However, a mechanism for movement other than the rotation may be included instead of the mechanism for the rotation. In this example, the robot 1 moves the sixth jig 1011. However, as another configuration example, a configuration may be adopted in which the sixth jig 1011 is moved by another device or manually.

Step S10

The robot 1 performs work for the other opening section of the first box material section 1001.

Specifically, the robot 1 performs work on the tuck and the flap for which work has not been performed yet in the same manner as the work performed on the tuck and the flap for which the work has already been completed. Consequently, in both of the opening sections in the two places of the first box material section 1001, the tucks and the flaps are closed and the first box 1001A is completed. That is, the completed first box 1001A is generated from the first box material section 1001.

In this example, the configuration is explained in which the robot 1 performs both the kinds of work by replacing the positions of the tuck and the flap for which the work has already been completed with the positions of the tuck and the flap for which work has not been performed yet. However, as another configuration example, a configuration may be adopted in which the robot 1 performs both the kinds of work without changing the positions of the tuck and the flap for which the work has already been completed and the positions of the tuck and the flap for which work has not been performed yet.

Outline of the First Work

As explained above, the robot 1 according to this embodiment assembles the first box material section 1001 using the two arms.

Schematically, first, the robot 1 holds one side of the first box material section 1001, which is placed horizontally, with the one first palm 41-1 and holds the other side of the first box material section 1001 with the second palm 41-2. When the first box material section 1001 is simply pushed horizontally, the first box material section 1001 is likely to be crushed. Therefore, the robot 1 moves the one first palm 41-1 obliquely upward to raise the first box material section 1001. When both the palms (the first palm 41-1 and the second palm 41-2) of the robot 1 are detached from the first box material section 1001 in this state, the shape of the first box material section 1001 is likely to return to the original state. Therefore, the robot 1 sets a jig (the first jig 311) like a lid in the first box material section 1001 while gripping the first box material section 1001 with the claws of one hand (the claws of the second end effector END2).

In this way, in this embodiment, for example, even when there is no space for gripping, with the robot 1, the portions of the tucks in the two places of the first box material section 1001, the robot 1 is capable of raising a tubular portion (a portion surrounded by the four surfaces 401 to 404) of the first box material section 1001.

Note that, when the first jig 311 is set as in this example, it is possible to form a strong crease in the first box material section 1001. However, as another configuration example, the first jig 311 does not have to be used.

Schematically, subsequently, the robot 1 folds the tuck earlier than the flap to crease the tuck. This is for the purpose of preventing the flap and the tuck from interfering with each other when the flap is folded into the inside of the opening section of the first box material section 1001. At this point, the robot 1 can prevent the tuck from being folded in a direction opposite to an expected direction by gripping a simple L-shaped jig (the second jig 321) and setting the jig oblique to a set jig (the sixth jig 1011) to fold the tuck. Subsequently, the robot 1 folds the flap. In this example, for each of the flaps in the two places, the robot 1 uses a jig (the second jig 321) same as the jig used for the creasing of the tuck and moves the jig in the lateral direction to fold the flap. Thereafter, the robot 1 pushes the jig toward the inside of the opening section of the first box material section 1001 to thereby crease the flap. Note that the robot 1 may detect (determine) contact of the jig and the flap using force control.

Schematically, subsequently, the robot 1 inserts the tuck. At this point, the robot 1 sets a jig (the third jig 331) like a slide and inserts the tuck under the flap while maintaining, with a portion of a slope of the jig, a state in which the tuck is folded to nearly 90 degrees. Note that a portion like a guide plate under the slope of the jig is necessary, for example, for the tuck to climb over a step formed by a joint or a pasted surface of paper of the first box material section 1001. The robot 1 uses a jig (the fourth jig 341) formed in a concave shape when viewed from above to apply a force to both ends of the tuck and inserts the tuck. Thereafter, for example, the robot 1 may push the tuck several times with the jig and more surely insert the tuck.

In this way, in this embodiment, it is possible to crease the flap and the tuck and improve stability of the insertion of the tuck.

The opening sections in the two places (the tucks and the flaps) are present in the first box material section 1001. Therefore, the robot 1 is capable of changing the disposition of the first box material section 1001 and perform work by rotating at least the portion of the stand of the sixth jig 1011 (the table) 180 degrees.

Explanation of Second Work Performed by the Robot

Second work performed by the robot 1 is explained with reference to FIGS. 29 to 33.

Figure 29:
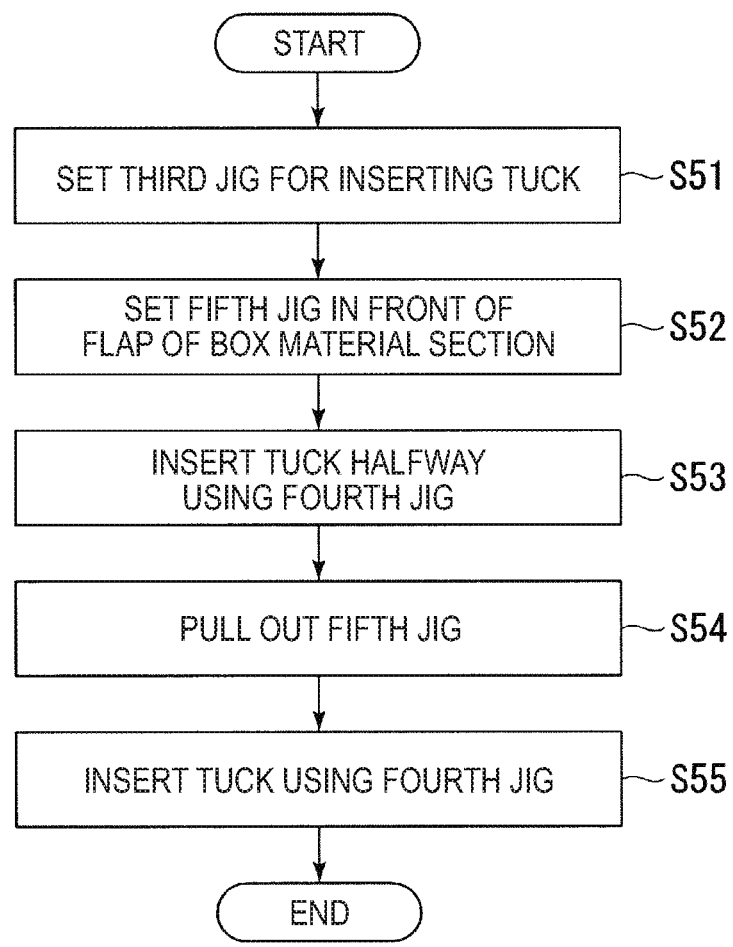
FIG. 29 is a diagram showing a procedure of processing of work (second work) performed by the robot according to the embodiment of the invention.

FIG. 29 is a diagram showing an example of a procedure of processing of work (the second work) performed by the robot 1 according to the embodiment of the invention.

FIGS. 30 to 33 are respectively diagrams showing a process of the work (the second work) performed by the robot 1 according to the embodiment of the invention. In this example, a temporal flow of the process of the second work is shown in the order from FIG. 30 to FIG. 33.

The second work is another example concerning the work of the insertion of the tuck in steps S6 and S7 shown in FIG. 15.

In the second work, the first box material section 1001 of the box material 201 shown in FIG. 3 is assembled. In FIGS. 30 to 33, as in FIGS. 26 to 28, to clearly show the figures, a part of components or reference numerals and signs are sometimes not shown.

In FIGS. 30 to 33, reference numerals and signs same as the reference numerals and signs shown in FIG. 1 and FIGS. 7 to 14 are used. As reference numerals of the surfaces of the first box material section 1001, reference numerals different from the reference numerals shown in FIGS. 3 and 4 are used. However, since the surfaces have the same shape, the surfaces disposed the same correspond to one another.

The work is explained below in the order of processing in steps S51 to S55 shown in FIG. 29.

Step S51

The robot 1 sets the third jig 331 for inserting the tuck.

The processing in step S51 is the same as the processing in step S6 shown in FIG. 15.

As in the processing in step S6, the tuck is creased on the upper side by processing same as the processing insteps S1 to S5. The flaps on both the sides are bent.

Step S52

The robot 1 sets the fifth jig 351 in front of the flap of the first box material section 1001.

Figure 30:
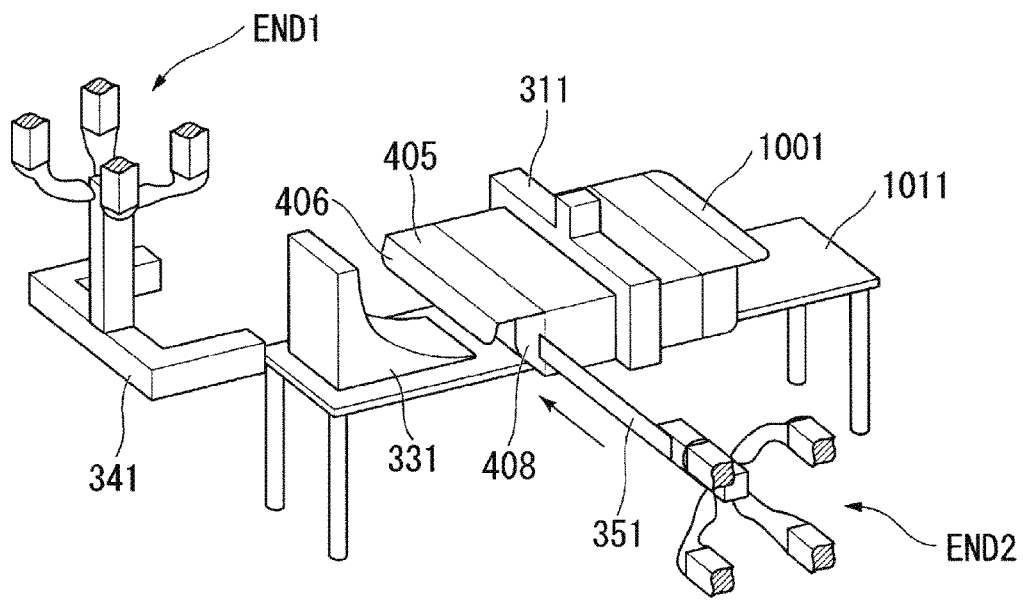
FIG. 30 is a diagram showing a process of work (the second work) performed by the robot according to the embodiment of the invention.

Specifically, as shown in FIG. 30, the robot 1 grips the fifth jig 351 with the claws of the second end effector END2. In the initial state, the fifth jig 351 is placed in the work region of the robot 1. The robot 1 disposes the fifth jig 351 in front of the flap (the surface 407 and the surface 408). At this point, the robot 1 inserts, on a side (the outer side) opposite to the inner side of the first box material section 1001, the rectangular portion of the fifth jig 351 in parallel to the surfaces 407 and 408 of the flap bent in parallel (or substantially in parallel) to the opening section of the first box material section 1001. Consequently, the surfaces 407 and 408 of the flap are set in contact with and held by the fifth jig 351 in a state in which the surfaces 407 and 408 are bent.

In this example, as in the processing in step S7 shown in FIG. 15, the robot 1 grips the fourth jig 341 with the claws of the first end effector END1.

Step S53

The robot 1 inserts the tuck halfway using the fourth jig 341.

Figure 31:
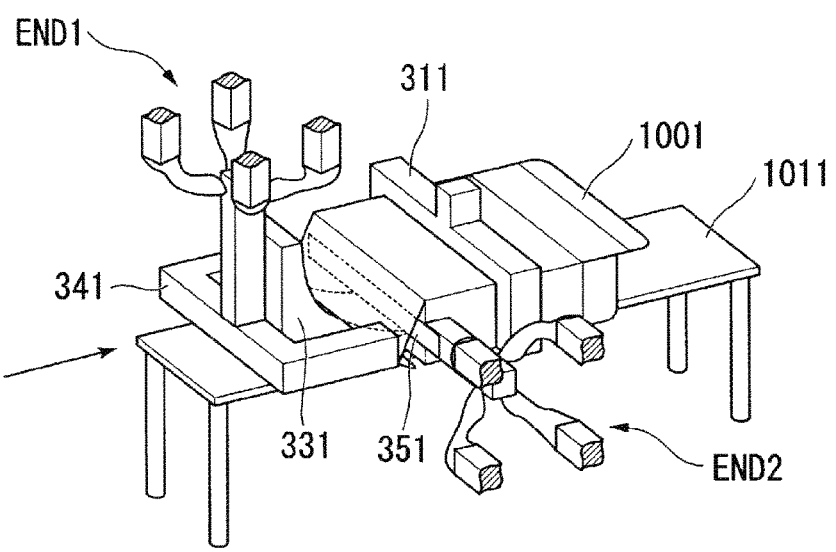
FIG. 31 is a diagram showing the process of work (the second work) performed by the robot according to the embodiment of the invention.

Specifically, as shown in FIG. 31, while keeping gripping the fourth jig 341 with the claws of the first end effector END1, the robot 1 moves the first end effector END1 and brings the fourth jig 341 into contact with the third jig 331.

Subsequently, while keeping gripping the fourth jig 341 with the claws of the first end effector END1, the robot 1 moves the first end effector END1 and brings, with the fourth jig 341, the third jig 331 close to the opening section of the first box material section 1001. The robot 1 disposes the surfaces (the surfaces closest to the first box material section 1001 side) of the distal ends of the two protruding portions of the fourth jig 341 near the boundary between the first surface 401 and the surface 405 of the tuck. Thereafter, the robot 1 slightly moves the fourth jig 341 to the lower side while keeping the lower surface of the fourth jig 341 parallel to the first surface 401 of the first box material section 1001.

Subsequently, while keeping gripping the fourth jig 341 with the claws of the first end effector END1, the robot 1 moves the first end effector END1 and brings, with the fourth jig 341, the third jig 331 close to the opening section of the first box material section 1001. In this example, the robot 1 inserts the tuck halfway without completely inserting the tuck. A degree of inserting the tuck halfway may be optionally set.

Step S54

The robot 1 pulls out the fifth jig 351.

Figure 32:
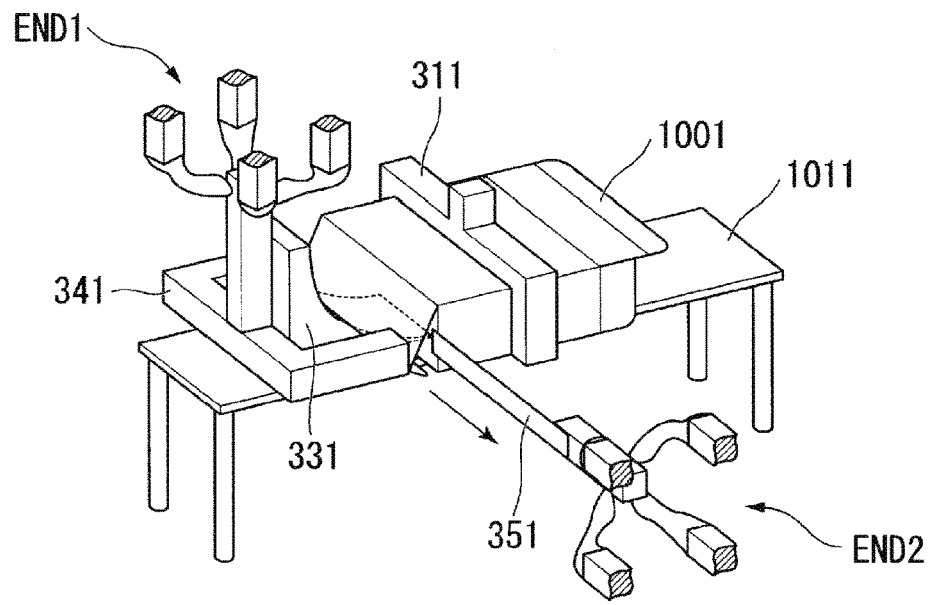
FIG. 32 is a diagram showing the process of work (the second work) performed by the robot according to the embodiment of the invention.

Specifically, as shown in FIG. 32, while keeping gripping the fifth jig 351 with the claws of the second end effector END2, the robot 1 moves the second end effector END2 and pulls out the rectangular portion of the fifth jig 351 from the front of the surfaces 407 and 408. In this example, the robot 1 pulls out the rectangular portion of the fifth jig 351 in a direction opposite to the direction in which the robot 1 inserts the rectangular portion of the fifth jig 351 into front of the surfaces 407 and 408 of the flap.

Step S55

The robot 1 inserts the tuck using the fourth jig 341.

Figure 33:
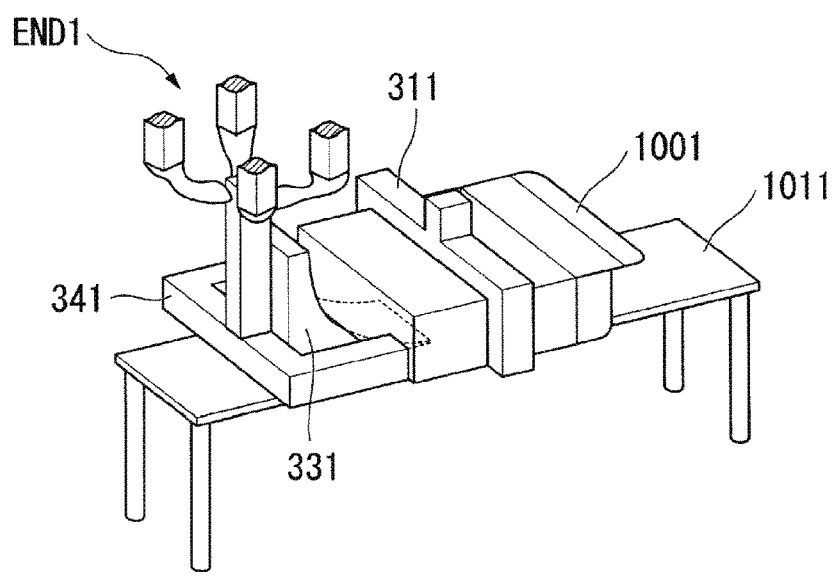
FIG. 33 is a diagram showing the process of work (the second work) performed by the robot according to the embodiment of the invention.

Specifically, as shown in FIG. 33, while keeping gripping the fourth jig 341 with the claws of the first end effector END1, the robot 1 moves the first end effector END1, brings, with the fourth jig 341, the third jig 331 close to the opening section of the first box material section 1001, and completely inserts the tuck. Consequently, the surface 406 of the tuck is housed in the opening section of the first box material section 1001. The surface 405 of the tuck is completed as a surface (one surface of the rectangular parallelepiped first box 1001A) that covers the opening section.

A configuration in which the robot 1 inserts the tuck while holding the flap with the fifth jig 351 as in this example is effective, for example, in particular, when the robot 1 inserts the tuck in a state in which an object (e.g., a packed object) is housed in the first box material section 1001. That is, even when the object housed in the first box material section 1001 pushes the flap from the inner side toward the outer side of the first box material section 1001, it is possible to smoothly insert the tuck while holding the flap from the outer side with the fifth jig 351.

In this example, the robot 1 inserts the tuck halfway in a state in which the fifth jig 351 is set in contact with the flap and thereafter completely inserts the tuck in a state in which the fifth jig 351 is removed. Such work is effective, for example, in particular, when the fifth jig 351 is pressed by the tuck and less easily removed in a state in which the tuck is completely inserted.

As another configuration example, the robot 1 may completely insert the tuck in the state in which the fifth jig 351 is set in contact with the flap and detach the fifth jig 351 in the state in which the tuck is completely inserted.

Outline of the Second Work

As explained above, the robot 1 according to this embodiment assembles the first box material section 1001 using the two arms.

Specifically, for example, when an object is put in the inside of the opening section of the first box material section 1001, it is likely that the flap cannot be folded inward, the flap returns to nearly a state before being creased, and the flap interferes with the tuck when the tuck is inserted. Therefore, when inserting the tuck, the robot 1 holds a jig (the fifth jig 351) like a guide plate with the claws of one hand (the claws of the second end effector END2) and inserts the tuck in a state in which the flap is held by the jig. At this point, the robot 1 pulls out the jig like (the fifth jig 351) the guide plate near a place where the distal end of the tuck is in contact with the lower surface (the third surface 403) of the first box material section 1001, that is, around a place where a part of the distal end of the tuck is over the flap and performs inserting operation of the tuck.

In this way, in this embodiment, even when the object is put in the inside of the opening section of the first box material section 1001, it is possible to hold the flap and smoothly insert the tuck. For example, when inserting the tuck, it is possible to prevent the tuck from interfering with the flap and, even if a crease of the flap is insufficient, enable and stabilize the insertion of the tuck.

In this example, a tabular portion of the jig like the guide plate is pulled out in a stage when the tuck is inserted halfway. However, as another configuration example, when the tabular portion is thin, the tabular portion may be pulled out after the tuck is completely inserted and closed.

Note that, in this example, it is assumed that the object is put in the inside of the opening section at a point in time when the tubular portion (the portion surrounded by the four surface 401 to 404) of the first box material section 1001 is raised. However, as another example, at a point in time when the tuck and the flap of one of the opening sections in the two places are closed, the object may be put in the inside of the opening section from the other opening section. As an example, it is also possible to use a jig (not shown in the figure) having a dustpan shape or another shape, move the object placed on the jig from the opening section to the inside of the first box material section 1001 along the surface of the jig, and house the object in the inside of the opening section.

Explanation of Third Work Performed by the Robot

Third work performed by the robot 1 is explained with reference to FIGS. 34 to 40.

Figure 34:
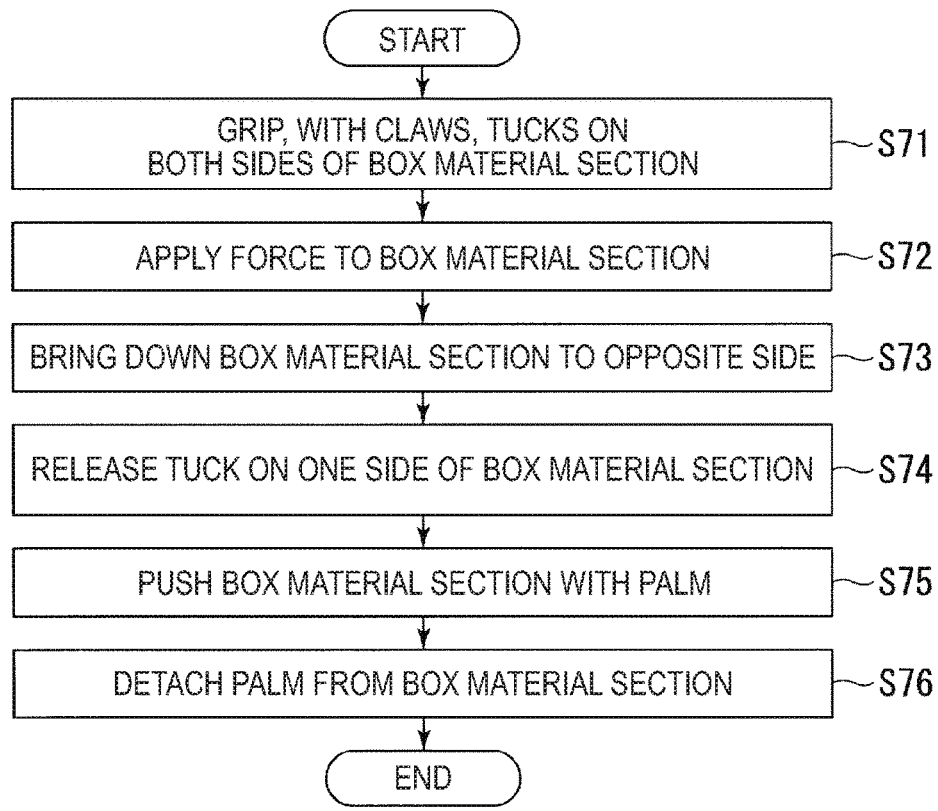
FIG. 34 is a diagram showing a procedure of processing of work (third work) performed by the robot according to the embodiment of the invention.

FIG. 34 is a diagram showing an example of a procedure of processing of work (the third work) performed by the robot 1 according to the embodiment of the invention.

FIGS. 35 to 40 are respectively diagrams showing a process of the work (the third work) performed by the robot 1 according to the embodiment of the invention. In this example, a temporal flow of the process of the third work is shown in the order from FIG. 35 to FIG. 40.

The third work is work for assembling the second box material section 1002.

In the third work, the second box material section 1002 of the box material 201 shown in FIG. 3 is assembled. In FIGS. 35 to 40, in order to clearly show the figures, only the components of the second box material section 1002 are shown concerning the box material 201. A part or all of the manipulators (the first manipulator MNP1 and the second manipulator MNP2) and the end effectors (the first end effector END1 and the second end effector END2) are sometimes not shown. In FIGS. 35 to 40, in order to clearly show the figures, a part or all of the other objects (e.g., the jig) or the reference numerals and signs in the work region where work on the box material 201 is performed are sometimes not shown.

In FIGS. 35 to 40, reference numerals and signs same as the reference numerals and signs shown in FIG. 1 are used. For example, as reference numerals of the surfaces of the second box material section 1002, reference numerals different from the reference numerals shown in FIGS. 3 and 4 are used. However, since the surfaces have the same shape, the surfaces disposed the same correspond to one another.

The work is explained below in the order of processing in steps S71 to S76 shown in FIG. 34.

In the initial state, the second box material section 1002 is in a completely folded-up state.

In this example, the box material 201 is fixed to the sixth jig 1011 not to deviate because of the work by the robot 1.

In this example, a direction from the sixth jig 1011 (in this example, the table) to the second box material section 1002 is represented as an upward direction, a side surface (a surface 504) present on the lower side before rising is represented as a left side, and a side surface (a surface 502) present on the upper side before the rising is represented as a right side.

Step S71

The robot 1 grips the tucks on both side of the second box material section 1002 with the claws.

Figure 35:
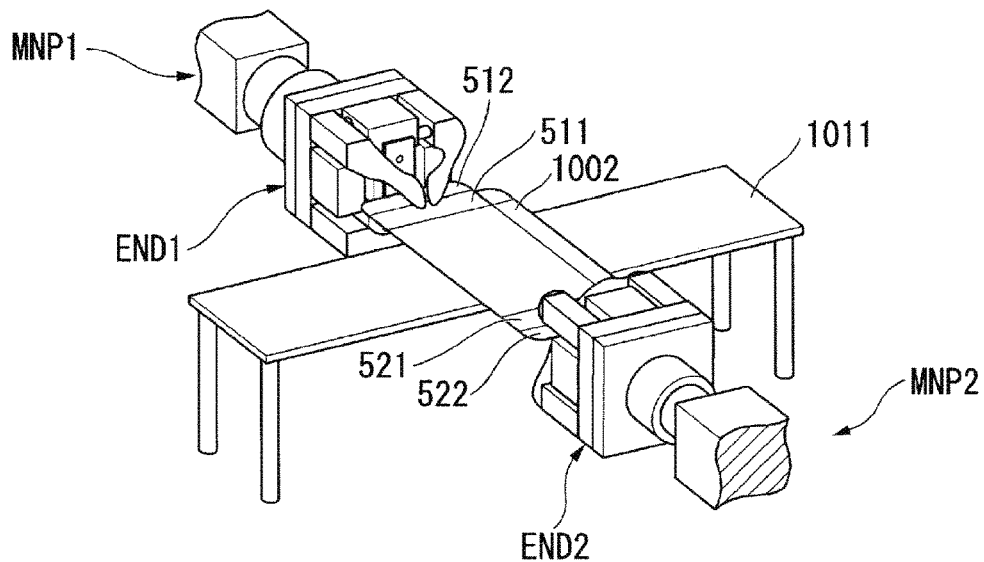
FIG. 35 is a diagram showing a process of the work (the third work) performed by the robot according to the embodiment of the invention.

Specifically, as shown in FIG. 35, the robot 1 grasps the tuck (one or both of a surface 511 and a surface 512) on one side of the second box material section 1002 with the claws of the first end effector END1 and grips the tuck (one or both of a surface 521 and a surface 522) on the other side of the second box material section 1002 with the claws of the second end effector END2.

Step S72

The robot 1 applies a force to the second box material section 1002.

Figure 36:
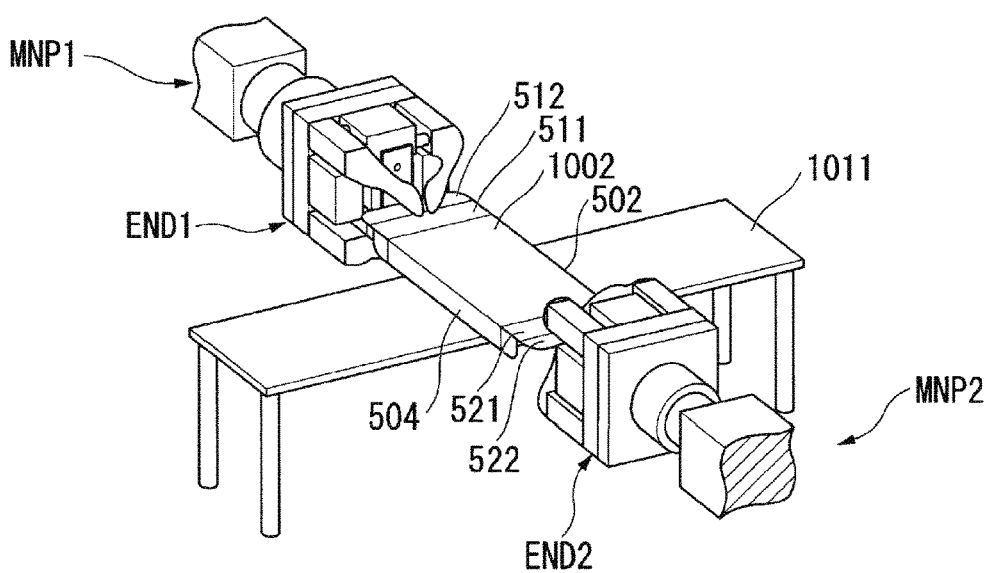
FIG. 36 is a diagram showing the process of the work (the third work) performed by the robot according to the embodiment of the invention.

Specifically, as shown in FIG. 36, in a state in which the tuck on one side is gripped by the claws of the first end effector END1 and the tuck on the other side is gripped by the claws of the second end effector END2, the robot 1 applies a force for raising the second box material section 1002 to the second box material section 1002. The force is applied in, for example, an oblique right upward direction. Consequently, the tubular portion (the portion surrounded by the four surfaces) of the second box material section 1002 gradually rises.

Step S73

The robot 1 turns over the second box material section 1002 to the opposite side.

Figure 37:
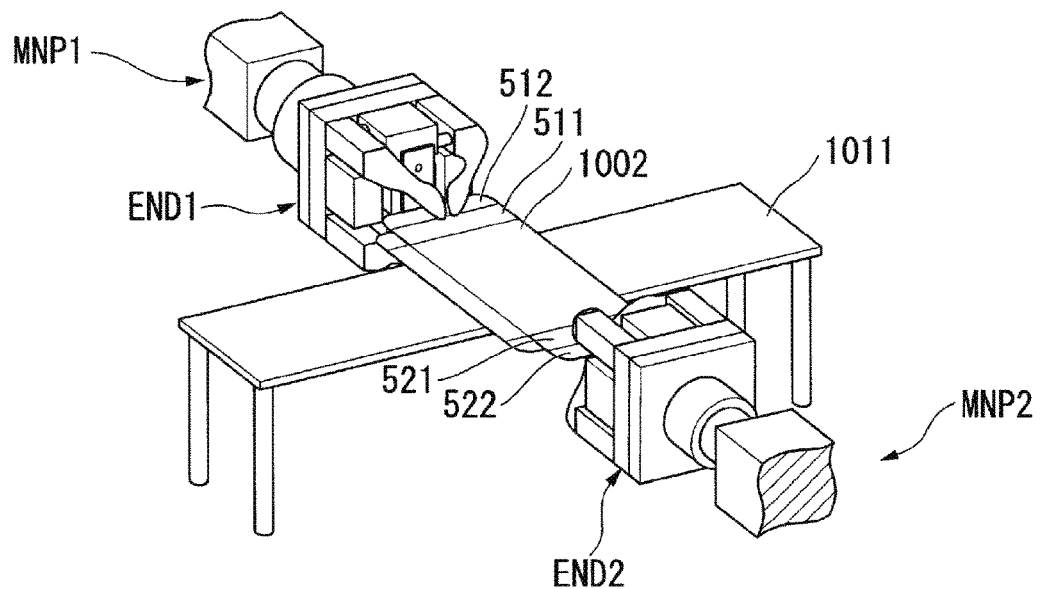
FIG. 37 is a diagram showing the process of the work (the third work) performed by the robot according to the embodiment of the invention.

Specifically, as shown in FIG. 37, in the state in which the tuck on one side is gripped by the claws of the first end effector END1 and the tuck on the other side is gripped by the claws of the second end effector END2, the robot 1 raises the second box material section 1002 and thereafter applies a force to the second box material section 1002 and turns over the tubular portion (the portion surrounded by the four surfaces) of the second box material section 1002 to the opposite side. The force is applied in, for example, an oblique right downward direction. Consequently, the tubular portion (the portion surrounded by the four surfaces) of the second box material section 1002 is folded up to a side opposite to a state in which the tubular portion is folded up in the initial state.

Step S74

The robot 1 releases the tuck on one side of the second box material section 1002.

Figure 38:
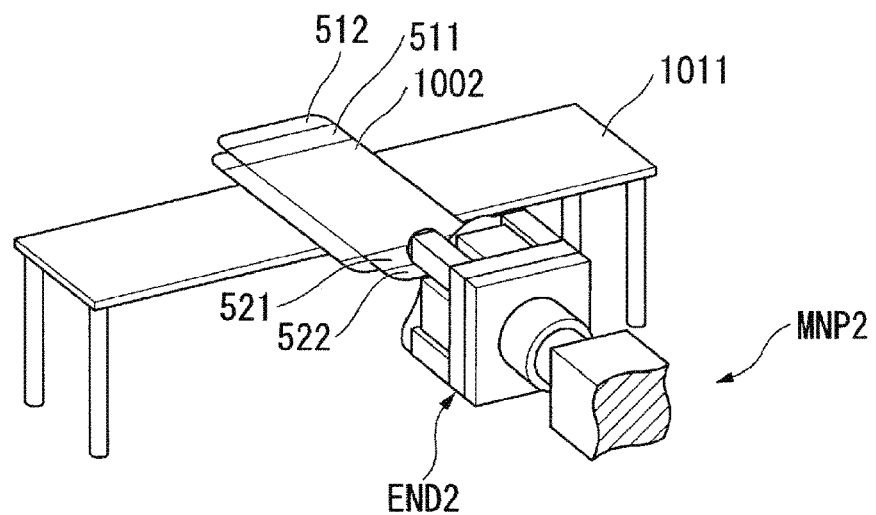
FIG. 38 is a diagram showing the process of the work (the third work) performed by the robot according to the embodiment of the invention.

Specifically, as shown in FIG. 38, the robot 1 releases the state in which the tuck on one side is gripped by the claws of the first end effector END1. At this point, the robot 1 keeps gripping the tuck on the other side with the claws of the second end effector END2.

Step S75

The robot 1 pushes the second box material section 1002 with the palm.

Figure 39:
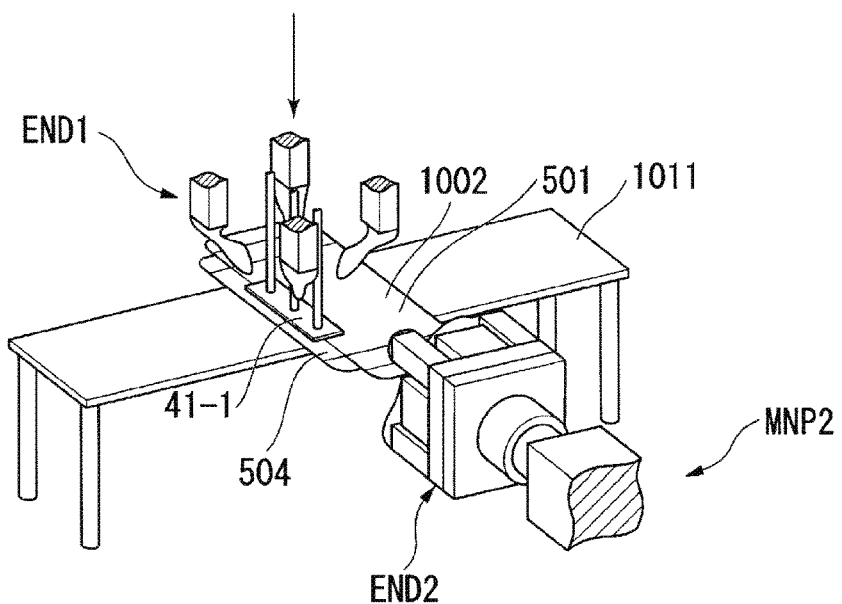
FIG. 39 is a diagram showing the process of the work (the third work) performed by the robot according to an embodiment of the invention.

Specifically, as shown in FIG. 39, while keeping gripping the tuck on the other side with the claws of the second end effector END2, the robot 1 pushes, with the surface of the first palm 41-1 of the first end effector END1, the surface (one or both of a surface 501 and the surface 504) on the upper side of the tubular portion (the portion surrounded by the four surfaces) of the second box material section 1002 to the lower side. At this point, the robot 1 sets the surface of the first palm 41-1 and the surface on the upper side of the tubular portion (the portion surrounded by the four surfaces) of the second box material section 1002 to be parallel.

Step S76

The robot 1 detaches the palm from the second box material section 1002.

Figure 40:
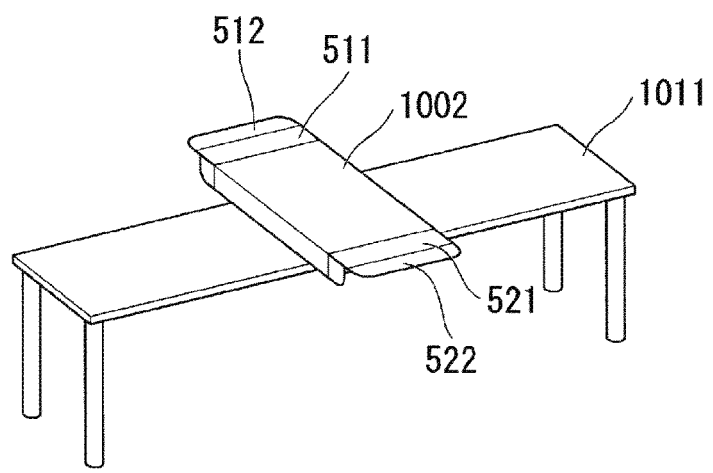
FIG. 40 is a diagram showing the process of the work (the third work) performed by the robot according to the embodiment of the invention.

Specifically, as shown in FIG. 40, the robot 1 detaches the palm from the second box material section 1002.

Specifically, as shown in FIG. 40, the robot 1 detaches the surface of the first palm 41-1 of the first end effector END1 from the surface on the upper side of the tubular portion (the portion surrounded by the four surfaces) of the second box material section 1002. In this example, the robot 1 releases the state in which the tuck on the other side is gripped by the claws of the second end effector END2. Consequently, the tubular portion (the portion surrounded by the four surfaces) of the second box material section 1002 rises and the second box 1002A is completed.

The robot 1 may assemble, according to any method, the tucks and the flaps in the two places of the second box material section 1002. As an example, the robot 1 may assemble the portions of the tucks and the flaps in the two places of the second box material section 1002 using a method same as the method of assembling the first box material section 1001. At this point, for example, the robot 1 may assemble the portions of the tucks and the flaps in the two places of the second box material section 1002 after changing the disposition of the second box material section 1002 with respect to the sixth jig 1011 (in this example, the table).

In this example, the third box material section 1003 is assembled according to a method same as the method of assembling the second box material section 1002.

As an example, it is also possible that, after the processing in steps S1 to S8 shown in FIG. 15 (the raising of the first box material section 1001 and the insertion of the tuck and the flap on one side) is performed, the processing in steps S71 to S76 shown in FIG. 34 (a part or the entire assembly of the second box material section 1002 present on the one side) is performed, and, thereafter, after the processing in steps S9 and S10 shown in FIG. 15 (the rotation of the sixth jig 1011 and the insertion of the tuck and the flap on the other side of the first box material section 1001) is performed, the processing (a part or the entire assembly of the third box material section 1003 present on the other side) same as the processing in steps S71 to S76 shown in FIG. 34 is performed. The processing in steps S6 and S7 shown in FIG. 15 may be replaced with the processing in steps S51 to S55 shown in FIG. 29.

Outline of the Third Work

As explained above, the robot 1 according to this embodiment assembles the second box material section 1002 using the two arms.

Schematically, in this example, when raising the second box material section 1002, the robot 1 can insert the hands into the tucks in the two places. The robot 1 is capable of raising the tubular portion (the portion surrounded by the four surfaces) of the second box material section 1002 by gripping the tucks in the two places of the second box material section 1002 with the claws of both the hands (the claws of the first end effector END1 and the claws of the second end effector END2) and moving the tucks upward (or obliquely upward). Note that the robot 1 may determine completion of processing for lifting the second box material section 1002 with the claws of both the hands, for example, on the basis of a moving distance (a moving distance for regarding that the processing is completed).

In this way, when the robot 1 can grip the tucks in the two places of the box material section placed horizontally (in this example, the second box material section 1002) with the claws of both the hands, that is, when spaces for enabling the claws of both the hands to approach the tucks in the two places are present, it is possible to raise the box material section by gripping the tucks in the two places with the claws of both the hands and moving the claws of both the hands obliquely upward with respect to the set jig (the sixth jig 1011).

In this example, the robot 1 can form a strong crease by, after raising the second box material section 1002, further tilting the second box material section 1002 to the opposite side by 90 degrees or more in that state. It is possible to improve stability.

Outline of the Embodiment Explained Above

As explained above, the robot 1 according to this embodiment can assemble and mold a box (a box body).

In general, in order to assemble a box made of a soft object such as paper, it is necessary to fold only expected portions and further insert folded flaps and tucks. When inserting the flaps and the tucks, it is necessary to control operation such that interference with a peripheral object (a part of the box) or breakage of the object does not occur. For example, it is possible to assemble the box if an individually uniform device is configured. However, usually, such a device is complicated. The device cannot assemble a box having a slightly different shape.

On the other hand, the robot 1 according to this embodiment is capable of devising, targeting a box like a so-called caramel box, using a simple jig, an assembly method for the box and assembling the box.

As a configuration example, there is provided a robot (in an embodiment, the double-arm robot 1 shown in FIG. 1) including a first arm and a second arm. The robot forms a box body (in the embodiment, the box body including at least the first box material section 1001) including a first plate body (in the example shown in FIG. 10, the first surface 401), a second plate body (in the example shown in FIG. 10, the second surface 402), a third plate body (in the example shown in FIG. 10, the third surface 403), and a fourth plate body (in the example shown in FIG. 10, the fourth surface 404), the first plate body and the second plate body being coupled in a first part (in the example shown in FIG. 10, the first side 410), the second plate body and the third plate body being coupled in a second part (in the example shown in FIG. 10, the second side 420), the third plate body and the fourth plate body being coupled in a third part (in the example shown in FIG. 10, the third side 430), and the fourth plate body and the first plate body being coupled in a fourth part (in the example shown in FIG. 10, the fourth side 440). When a first angle (in the example shown in FIG. 10, the first angle θ1) formed by the first plate body and the second plate body is larger than a second angle (in the example shown in FIG. 10, the second angle θ2) formed by the second plate body and the third plate body, when a state at the time when the first angle is an angle of a folded-up state of the box body is represented as a first state and a state in which the first angle is smaller than the angle in the folded-up state is represented as a second state, the robot brings a first contact section (in the examples shown in FIGS. 11 to 13, the first palm 41-1) provided in the first arm into contact with the fourth part, brings a second contact section (in the examples shown in FIGS. 11 to 13, the second palm 41-2) provided in the second arm into contact with the second part, and applies torque to a joint of the robot to change the first state to the second state.

As a configuration example, in the robot, the angle in the folded-up state of the box body is 180 degrees (the examples shown in FIGS. 11 to 13).

As a configuration example, in the robot, the first contact section and the second contact section are respectively planes, and the robot sets a surface of the first contact section and a surface of the second contact section to be parallel, brings the first contact section into contact with the fourth part, and brings the second contact section into contact with the second part (the example shown in FIG. 11).

As a configuration example, in order to change the first state to the second state, in a state in which the first contact section is set in contact with the fourth part and the second contact section is set in contact with the second part, the robot pushes, with the first arm, the fourth part in a first direction extending from the third plate body to the first plate body and a second direction extending from the third part to the second part (the example shown in FIG. 11).

As a configuration example, after pushing, with the first arm, the fourth part in the first direction and the second direction, the robot pushes the fourth part in the second direction (the example shown in FIG. 12).

As a configuration example, after pushing the fourth part in the second direction with the first arm, the robot grips the box body with a second gripping section (in the embodiment, the claws of the second end effector END2) provided in the second arm and presses, with the first arm, a jig for fixing the first angle (in this embodiment, the first jig 311 shown in FIG. 5) against the box body.

As a configuration example, there is provided a control method for a robot (in the embodiment, the method of control performed by the control device 51 of the robot 1 shown in FIG. 1), the control method including: controlling a robot including a first arm and a second arm; and molding a box body including a first plate body, a second plate body, a third plate body, and a fourth plate body, the first plate body and the second plate body being coupled in a first part, the second plate body and the third plate body being coupled in a second part, the third plate body and the fourth plate body being coupled in a third part, and the fourth plate body and the first plate body being coupled in a fourth part. When a first angle formed by the first plate body and the second plate body is larger than a second angle formed by the second plate body and the third plate body, when a state at the time when the first angle is an angle of a folded-up state of the box body is represented as a first state and a state in which the first angle is smaller than the angle in the folded-up state is represented as a second state, a first contact section provided in the first arm is brought into contact with the fourth part, a second contact section provided in the second arm is brought into contact with the second part, and torque is applied to a joint of the robot to change the first state to the second state.

Second Embodiment

A second embodiment of the invention is explained in detail with reference to the drawings. Note that, in this embodiment, components same as the components in the first embodiment are denoted by the same reference numerals and signs. Explanation of the components is omitted or simplified.

Explanation of a Robot

A robot according to this embodiment is the same as the robot 1 according to the first embodiment. Therefore, explanation of the robot is omitted.

In the robot 1 in this embodiment, as in the first embodiment, a hand is used as the first end effector END1. The hand in this embodiment includes four claws (which may be called fingers) and the first palm 41-1. The first palm 41-1 includes a flat surface. The hand includes a column that supports the first palm 41-1. The length of the column increases and decreases to enable pressing or pulling by the flat surface of the first palm 41-1.

A hand is used as the second end effector END2. The hand includes four claws (which may be called fingers) and the second palm 41-2. The second palm 41-2 includes a flat surface. The hand includes a column that supports the second palm 41-2. The length of the column increases and decreases to enable pressing or pulling by the flat surface of the second palm 41-2.

Explanation of Work for Assembling Components with the Robot

First, components (work) and jigs are explained with reference to FIGS. 41 to 43.

Figure 41:
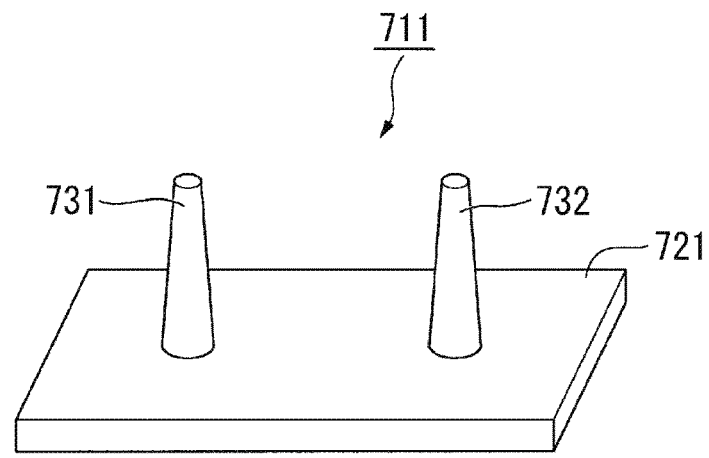
FIG. 41 is a diagram showing a configuration example of a jig according to the embodiment of the invention.

FIG. 41 is a diagram showing a configuration example of a jig 711 according to the embodiment of the invention.

The jig 711 includes a plate material 721 and two pins 731 and 732. The plate material 721 is a tabular object including a flat surface. The two pins 731 and 732 are provided at a predetermined interval on one surface of the plate material 721. The direction of the axes (the axial direction) of the two pins 731 and 732 is perpendicular to the surface of the plate material 721. In this embodiment, the two pins 731 and 732 have the same shape. The pins 731 and 732 have a shape of a columnar shaft (column) and have a taper-like shape decreasing in diameter toward the distal ends (the tips in a direction away from the plate material 721). The jig 711 (the plate material 721 and the two pins 731 and 732) is made of, for example, metal. Note that, for example, the plate material 721 and the two pins 731 and 732 may be integrally formed or may be formed as separate bodies and assembled.

In this embodiment, since the taper-like pins 731 and 732 are used, it is possible to make it easy to insert hole portions over the pins 731 and 732.

Note that, in this embodiment, inserting the hole portions over the pins means fitting the pins and the hole portions.

Figure 42:
FIG. 42 is a diagram showing a configuration example of a spring according to the embodiment of the invention.

FIG. 42 is a diagram showing a configuration example of springs 251 and 252 (components) according to the embodiment of the invention.

In FIG. 42, two springs 251 and 252 are shown. In this embodiment, the two springs 251 and 252 have the same shape. The two springs 251 and 252 are made of, for example, metal. The springs 251 and 252 are elastically deformable elastic members. When an excessive force is applied, the springs 251 and 252 could be plastically deformed. The springs 251 and 252 have a coil-like shape and have cylindrical hole portions on the inner sides of the coils.

Figure 43:
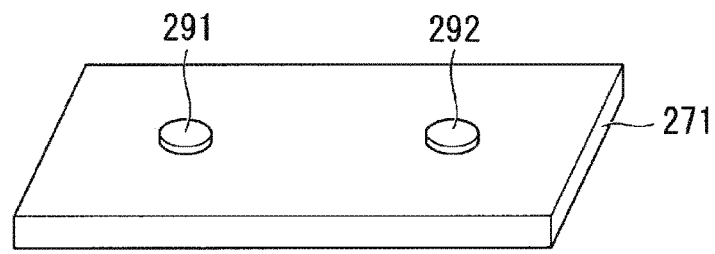
FIG. 43 is a diagram showing a configuration example of a plate material according to the embodiment of the invention.

FIG. 43 is a diagram showing a configuration example of a plate material 271 (a component) according to the embodiment of the invention.

The plate material 271 is a tabular object including a flat plane. The plate material 271 includes two cylindrical hole portions 291 and 292 at a predetermined interval. On one surface of the plate material 271, the respective hole portions 291 and 292 include protruding portions formed along contours of the holes. In this embodiment, the two hole portions 291 and 292 have the same shape. The plate material 271 is made of, for example, metal.

An example of a procedure of work for assembling components with the robot 1 is explained with reference to FIGS. 44 to 50.

In this embodiment, the robot 1 is capable of handling the jig 771 or the components (the plate material 271 and the springs 251 and 252) with the first manipulator MNP1 and the first end effector END1. Specifically, the robot 1 is capable of gripping the jig 711 or the components with the claws of the first end effector END1. The robot 1 is capable of pressing the jig 711 or the components with the first palm 41-1 of the first end effector END1. The robot 1 is capable of changing the position or the posture of the first end effector END1 with the first manipulator MNP1. The robot 1 is capable of referring to a detection result of the first force sensor 31-1 or picked-up images of the image pickup sections (the first image pickup section 11-1, the second image pickup section 11-2, the third image pickup section 21-1, and the fourth image pickup section 21-2). The detection result of the first force sensor 31-1 is used for, for example, force control. The picked-up images of the image pickup sections are used for, for example, visual servo.

Similarly, in this embodiment, the robot 1 is capable of handling the jig 711 or the components (the plate material 271 and the springs 251 and 252) with the second manipulator MNP2 and the second end effector END2. Specifically, the robot 1 is capable of gripping the jig 711 or the components with the claws of the second end effector END2. The robot 1 is capable of pressing the jig 711 or the components with the second palm 41-2 of the second end effector END2. The robot 1 is capable of changing the position or the posture of the second end effector END2 with the second manipulator MNP2. The robot 1 is capable of referring to a detection result of the second force sensor 31-2 or picked-up images of the image pickup sections (the first image pickup section 11-1, the second image pickup section 11-2, the third image pickup section 21-1, and the fourth image pickup section 21-2). The detection result of the second force sensor 31-2 is used for, for example, force control. The picked-up images of the image pickup sections are used for, for example, visual servo.

As a method of recognizing the positions or the postures of the jig 711 and the components (the plate material 271 and the springs 251 and 252) with the robot 1, any method may be used. As an example, the robot 1 may store information of a template of the jig 711 and the components (the plate material 271 and the springs 251 and 252) and recognize the positions or the postures of the jig 711 and the components (the plate material 271 and the springs 251 and 252) using pattern matching or the like on the basis of images of the jig 711 and the components (the plate material 271 and the springs 251 and 252) included in picked-up images and the information of the template. As another example, the robot 1 may store, in advance, a procedure of operation including the positions and the postures of the manipulators and the end effectors and perform the operation as described in the stored procedure. For example, it is also possible that markers indicating, for example, contents of operation (e.g., initial positions or end positions) are set for the robot 1 and the robot 1 recognizes, for example, the contents of operation on the basis of images of the markers included in picked-up images.

In this embodiment, the robot 1 grips the jig 711 with the four claws of the first end effector END1, grips the components (the plate material 271 and the springs 251 and 252) with the four claws of the second end effector END2, and performs work. Note that the end effector that handles the jig 711 and the end effector that handles the components may be opposite.

In the configuration in which the robot 1 grips both of the jig 711 and the components and performs work in this way, for example, it is possible to omit a space for a table or the like on which the jig 711 is set. Note that, as another configuration example, a configuration may be adopted in which, in a state in which the jig 711 is set on the table or the like, the robot 1 grips the components with one or both of the end effectors and performs work.

Figure 44:
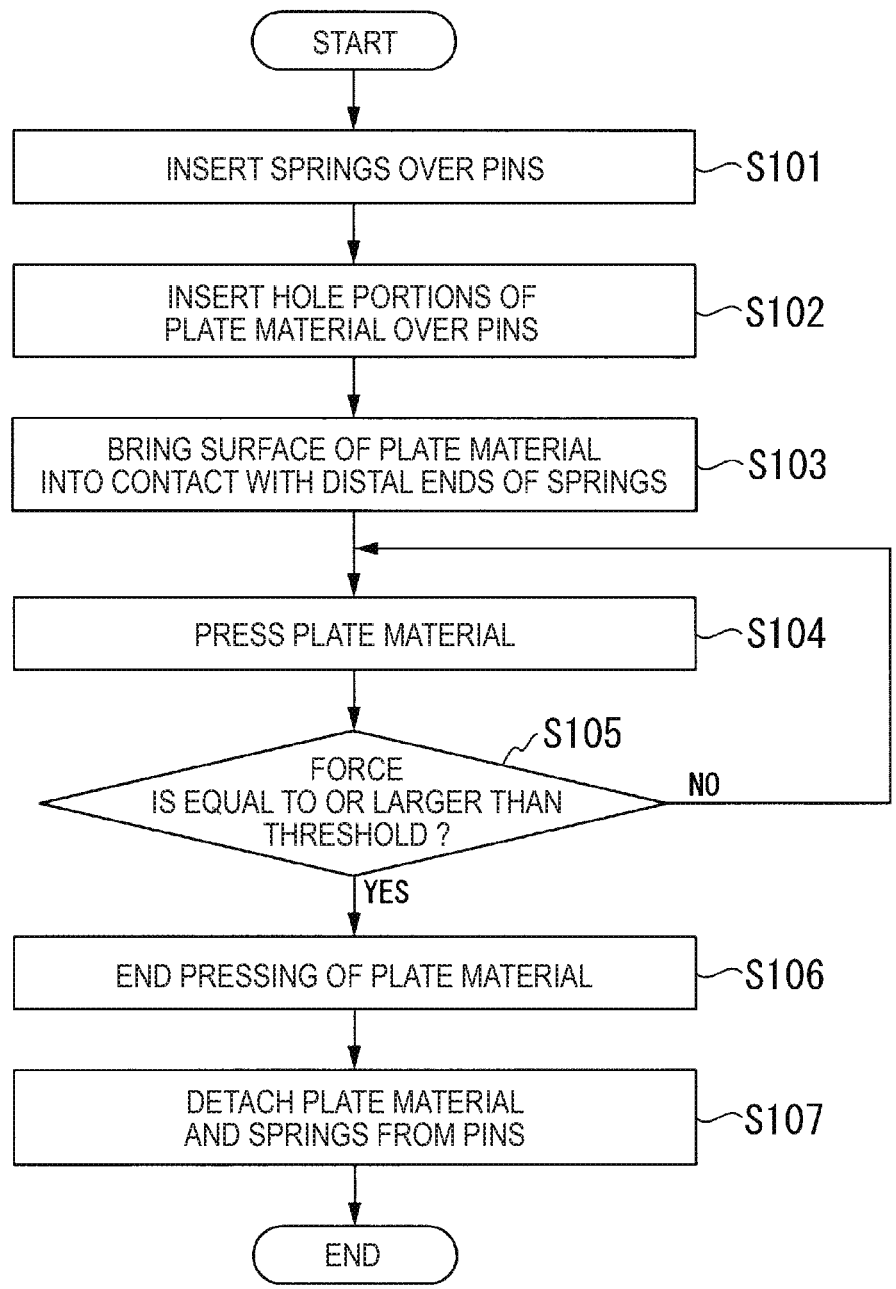
FIG. 44 is a flowchart showing an example of a procedure of work for assembling components with the robot according to the embodiment of the invention.

FIG. 44 is a flowchart showing an example of a procedure of work for assembling components with the robot 1 according to the embodiment of the invention.

FIGS. 45 to 50 are diagrams for explaining a process of the assembling work of components according to the embodiment of the invention.

Figure 45:
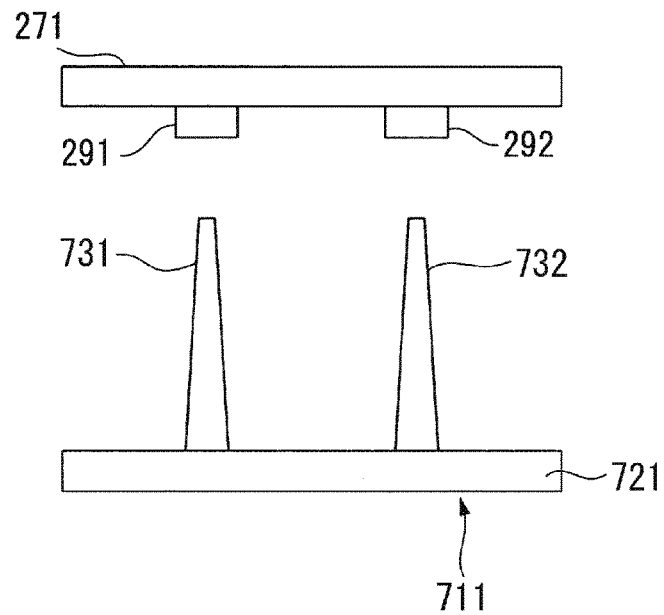
FIG. 45 is a diagram for explaining a process of the assembling work of the components according to the embodiment of the invention.

In FIG. 45, the jig 711 and the components (the plate material 271 and the springs 251 and 252) before the work are shown. Before the work, the jig 711 and the components are placed on, for example, a table in the work region of the robot 1.

In this embodiment, work for simultaneously assembling the two springs 251 and 252 to the plate material 271 with the robot 1 is explained.

Step S101

The robot 1 inserts the hole portions of the springs 251 and 252 (e.g., the hole portions on the inner sides of the coils) over the pins 731 and 732 of the jig 711.

Specifically, the robot 1 grips the jig 711 with the four claws of the first end effector END1, grips one spring 251 with the four claws of the second end effector END2 in that state, and inserts the hole portion of the spring 251 over one pin 731. Subsequently, the robot 1 grips the other spring 252 with the four claws of the second end effector END2 and inserts the hole portion of the spring 252 over the other pin 732.

Figure 46:
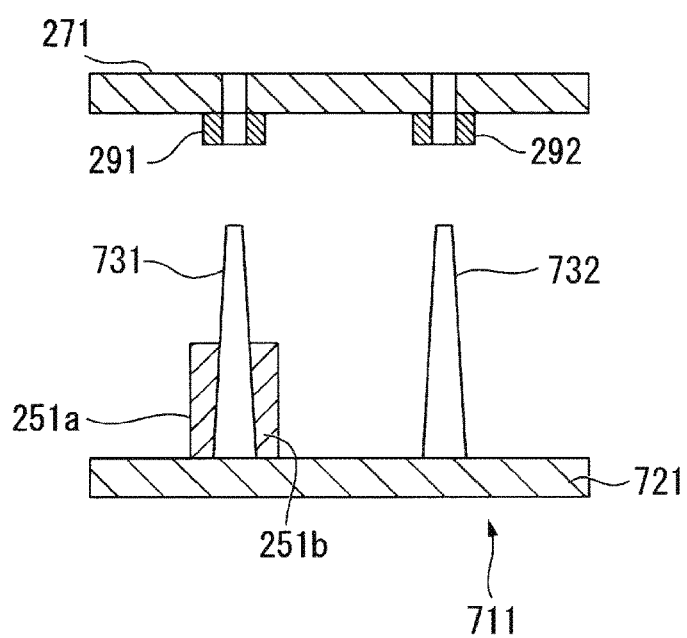
FIG. 46 is a diagram for explaining the process of the assembling work of the components according to the embodiment of the invention.

In FIG. 46, a state is shown in which the hole portion of one spring 251 is inserted over one pin 731 of the jig 711. In FIG. 46, a cross section on a plane including the axes of the pins 731 and 732 is shown. In the figure, the spring 251 is simplified and shown as two portions 251a and 251b in the cross section with coil portions omitted.

Figure 47:
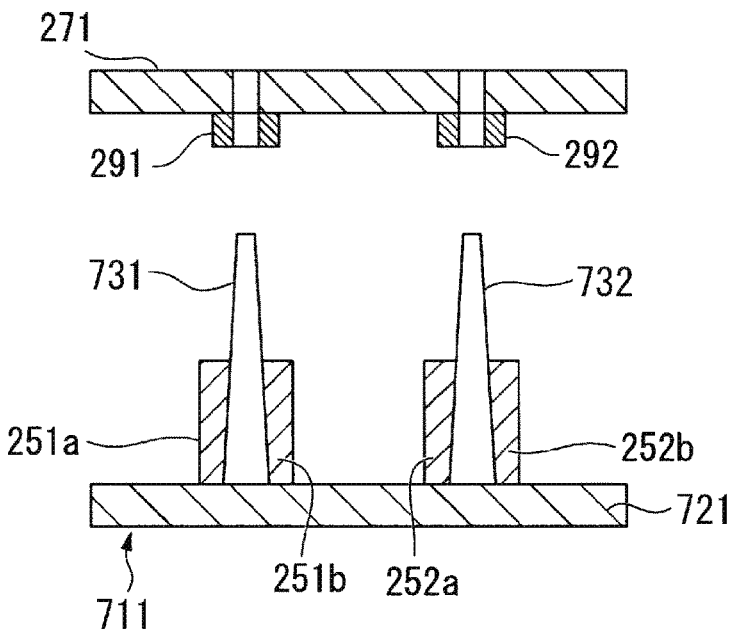
FIG. 47 is a diagram for explaining the process of the assembling work of the components according to the embodiment of the invention.

In FIG. 47, further, a state is shown in which the hole portion of the other spring 252 is inserted over the other pin 732 of the jig 711. In FIG. 47, a cross section on the plane including the axes of the pins 731 and 732 is shown. In the figure, the spring 252 is simplified and shown as two portions 252a and 252b in the cross section with coil portions omitted.

In this embodiment, the robot 1 inserts the hole portions of the springs 251 and 252 over the pins 731 and 732 of the jig 711. However, as another configuration example, it is also possible that a person manually inserts the hole portions of the springs 251 and 252 over the pins 731 and 732 of the jig 711 and the robot 1 performs the subsequent work.

Step S102

The robot 1 inserts the hole portions 291 and 292 of the plate material 271 over the pins 731 and 732. Specifically, in a state in which the jig 711 is gripped by the four claws of the first end effector END1, the robot 1 grips the plate material 271 with the four claws of the second end effector END2 and inserts the respective two hole portions 291 and 292 over the respective two pins 731 and 732.

In this embodiment, the robot 1 inserts the holes 291 and 292 of the plate material 271 over the pins 731 and 732 in a direction in which protruding portions of the hole portions 291 and 292 of the plate material 271 are in contact with the pins 731 and 732.

Step S103

The robot 1 brings the surface (the surface on which the protruding portions of the hole portions 291 and 292 are provided) of the plate material 271 into contact with the distal ends of the springs 251 and 252. Specifically, following the processing in step S102, while keeping gripping the plate material 271 with the four claws of the second end effector END2, the robot 1 brings the plate material 271 and the plate material 721 of the jig 711 close to each other and brings the surface of the plate material 271 into contact with the distal ends of the springs 251 and 252. The robot 1 releases the state in which the plate material 271 is gripped by the four claws of the second end effector END2 (i.e., opens the four claws to release the plate material 271). Consequently, the plate material 271 is placed in the place of the pins 731 and 732 of the jig 711. The plate material 271 is set in the jig 711. Note that accuracy of relative positions of the hole portions 291 and 292 of the plate material 271 and the pins 731 and 732 of the jig 711 only has to be, for example, at least a degree for enabling the subsequent work.

Figure 48:
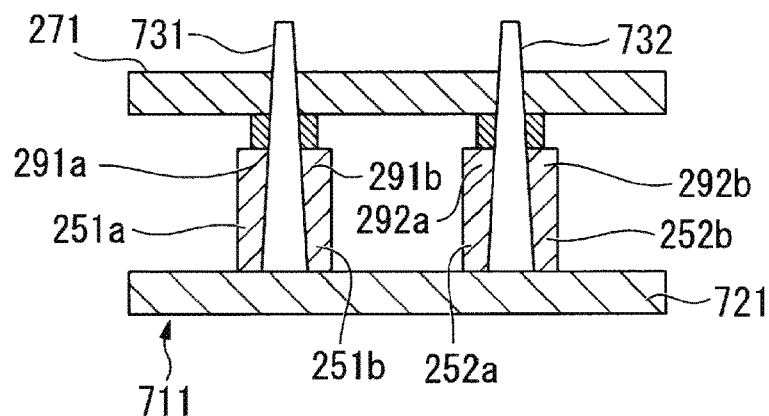
FIG. 48 is a diagram for explaining the process of the assembling work of the components according to the embodiment of the invention.

In FIG. 48, a state is shown in which the surface of the plate material 271 is brought into contact with the distal ends of the springs 251 and 252 after the hole portions 291 and 292 of the plate material 271 are inserted over the pins 731 and 732. In FIG. 48, a cross section on the plane including the axes of the pins 731 and 732 is shown. In the figure, one hole portion 291 (the protruding portion thereof) is shown as two portions 291a and 291b in the cross section. The other hole portion 291 (the protruding portion thereof) is shown as two portions 292a and 292b in the cross section.

Step S104

The robot 1 presses the hole portions 291 and 292 of the plate material 271 against the pins 731 and 732 and the springs 251 and 252. Specifically, in a state in which the jig 711 is gripped by the four claws of the first end effector END1, the robot 1 puts the second palm 41-2 of the second end effector END2 on the surface (the surface on which the protruding portions of the hole portions 291 and 292 are not provided) of the plate material 271 and presses the hole portions 291 and 292 of the plate material 271 against the pins 731 and 732 and the springs 251 and 252 by applying, using force control, a force to the second palm 41-2 in a direction in which the plate material 271 is brought close to the plate material 721 of the jig 711.

In this case, the robot 1 presses the plate material 271 in the axial direction of the pins 731 and 732 of the jig 711 such that the surface (the surface on which the protruding portions of the hole portions 291 and 292 are provided) of the plate material 271 and the axial direction are kept perpendicular to each other.

In this embodiment, since the surface of the plate material 721 of the jig 711 and the axial direction of the pins 731 and 732 are perpendicular, the robot 1 may press the plate material 271 such that the surface (the surface on which the protruding portions of the hole portions 291 and 292 are provided) of the plate material 271 and the surface (the surface opposed to the plate material 271) of the plate material 721 of the jig 711 are kept parallel to each other. As an example, while keeping the flat surface of the second palm 41-2 parallel to the plate material 721 of the jig 711, the robot 1 brings the flat surface into contact with the surface (the surface on which the protruding portions of the hole portions 291 and 292 are not provided) of the plate material 271 and presses, using force control, the plate material 271 in a direction toward the plate material 721 of the jig 711.

The robot 1 may put the second palm 41-2 on an intermediate position (or a position close to the intermediate position) of the two hole portions 291 and 292 on the surface of the plate material 271 and perform the pressing.

Figure 49:
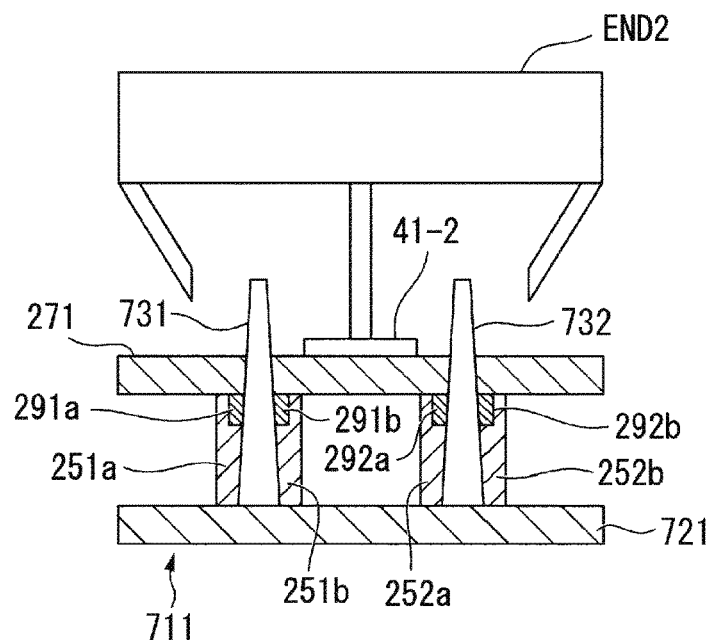
FIG. 49 is a diagram for explaining the process of the assembling work of the components according to the embodiment of the invention.

In FIG. 49, a state is shown in which the robot 1 sets the flat surface of the second palm 41-2 in contact with the surface of the plate material 271 and presses, with the second palm 41-2, the plate material 271 toward the plate material 721 of the jig 711.

Step S105

The robot 1 determines whether a force (reaction) detected by the second force sensor 31-2 is equal to or larger than a predetermined threshold. The predetermined threshold is stored in, for example, the robot 1 (e.g., the storing section 113) in advance. As the predetermined threshold, various values may be used. The predetermined value is a value for determining whether the plate material 271 and the springs 251 and 252 are regarded as being assembled. For example, the predetermined value is determined according to an experiment or a theory.

When determining that the force detected by the second force sensor 31-2 is equal to or larger than the predetermined threshold, the robot 1 shifts to processing in step S106. On the other hand, when determining that the force detected by the second force sensor 31-2 is smaller than the predetermined threshold, the robot 1 shifts to the processing in step S104.

Step S106

When determining that the force detected by the second force sensor 31-2 is equal to or larger than the predetermined threshold, the robot 1 ends the pressing of the plate material 271. Specifically, the robot 1 detaches the flat surface of the second palm 41-2 from the surface of the plate material 271. Consequently, the plate material 271 is placed in the place of the pins 731 and 732 of the jig 711. At this point, the respective two hole portions 291 and 292 of the plate material 271 and the respective two springs 251 and 252 are assembled and fixed by press-fitting.

In this embodiment, the protruding portions (fitting portions) of the respective two hole portions 291 and 292 of the plate material 271 and the distal end portions (fitting portions) of the respective two springs 251 and 252 are fit and fixed. At this point, the distal end portions (the fitting portions) of the respective two springs 251 and 252 are elastically deformed. Note that the distal end portions (the fitting portions) of the two springs 251 and 252 may be, for example, plastically deformed after the elastic deformation.

In this way, in this embodiment, a relation between relative positions of the hole portions 291 and 292 of the plate material 271 and the springs 251 and 252 does not have to accurately coincide with ideal positions (i.e., may slightly deviate from the ideal positions). In a state in which the flat surface of the second palm 41-2 is pushed out and the four claws are opened to a place where the four claws do not interfere with a target (in this example, the plate material 271) to be pushed in by the four claws, the robot 1 advances the second palm 41-2 in the direction of the jig 711 using force control until a target force (force of the predetermined threshold) is detected.

Step S107

The robot 1 detaches the plate material 271 and the springs 251 and 252 from the pins 731 and 732 of the jig 711. Specifically, the robot 1 grips the plate material 271 with the four claws of the second end effector END2 and moves away (i.e., separates) the plate material 271 from the jig 711 to pull out the two pins 731 and 732 of the jig 711 from the two hole portions 291 and 292 of the plate material 271.

Figure 50:
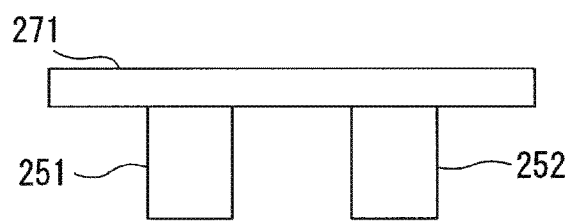
FIG. 50 is a diagram for explaining the process of the assembling work of the components according to the embodiment of the invention.
Figure 50:
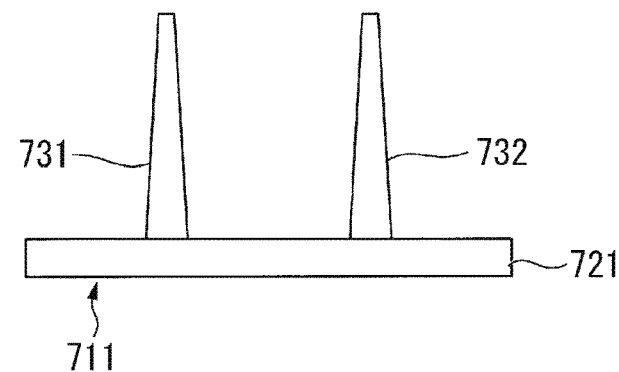

In FIG. 50, a state is shown in which the plate material 271, to which the springs 251 and 252 are assembled and fixed, is detached from the jig 711.

In this embodiment, the distal end portions (the fitting portions) of the respective springs 251 and 252 are deformed (e.g., elastically deformed) to increase the diameter. The distal end portions are press-fit and fit with the protruding portions (the fitting portions) of the respective hole portions 291 and 292 of the plate material 271 each other such that the distal end portions cover the outer circumferences of the protruding portions (the fitting portions) of the respective hole portions 291 and 292.

As explained above, the robot 1 according to this embodiment can assemble the plate material 271 and the springs 251 and 252 by fitting the fitting portions of the plate material 271 and the fitting portions of the springs 251 and 252. The robot 1 according to this embodiment can simultaneously assemble a plurality of (in the examples shown in FIGS. 41 to 50, two) springs 251 and 252 to the plate material 271.

The robot 1 according to this embodiment can assemble, using force control, the plate material 271 and the springs 251 and 252 to follow assembly positions (e.g., the fitting portions) of the plate material 271 and the springs 251 and 252. Therefore, the robot 1 according to this embodiment is capable of performing assembling according to following operation even if, for example, the axes of the hole portions 291 and 292 of the plate material 271 and the axes of the springs 251 and 252 do not coincide with each other (slight deviate from each other).

In this way, the robot 1 according to this embodiment is capable of easily performing the assembling work of components. For example, the robot 1 according to this embodiment is capable of performing the assembling work of components using a simple jig for standing components (in this embodiment, standing the springs 251 and 252 with the pins 731 and 732). The robot 1 according to this embodiment is capable of easily assembling a plurality of elastic components (in this embodiment, the springs 251 and 252) to other components (in this embodiment, the plate material 271). The robot 1 according to this embodiment can be applied to, for example, assembling work of components in creating a product with an industrial robot.

In this embodiment, for example, after the second palm 41-2 is set in an initial position on the basis of a marker or the like, the plate material 271 is pressed by the second palm 41-2 and a position where the pressing of the plate material 271 by the second palm 41-2 is ended is determined using force control. As anther configuration example, it is also possible that, after the second palm 41-2 is set in an initial position on the basis of a marker or the like, the plate material 271 is pressed by the second palm 41-2, and, when a relative positional relation between the position of the second palm 41-2 and a position where the jig 711 is gripped by the second end effector END2 becomes a predetermined positional relation, the pressing of the plate material 271 by the second palm 41-2 may be ended.

In this embodiment, of the springs 251 and 252 and the plate material 271 set on the jig 711, the robot 1 presses the plate material 271 with the second palm 41-2. However, as another configuration example, the robot 1 may press the springs 251 and 252 by pressing the jig 711 with the second palm 41-2. As another configuration example, the robot 1 may press both of the springs 251 and 252 and the plate material 271.

In this embodiment, of the springs 251 and 252 and the plate material 271 (the hole portions 291 and 292), the springs 251 and 252 are elastically deformed (or plastically deformed). However, as another configuration example, the plate material 271 (the hole portions 291 and 292) may be elastically deformed (or plastically deformed).

Explanation of Modifications

Figure 51:
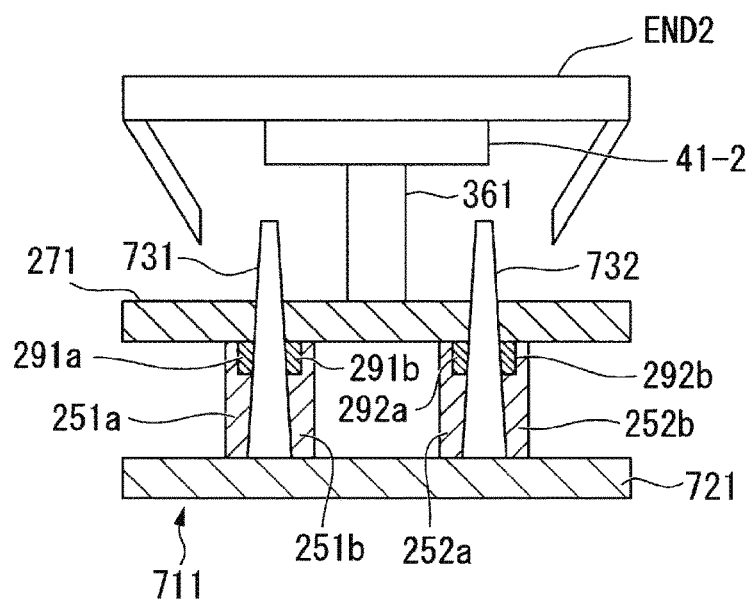
FIG. 51 is a diagram showing a modification of a pressing mechanism according to the embodiment of the invention.

FIG. 51 is a diagram showing a modification of a pressing mechanism according to the embodiment of the invention.

In FIG. 51, an example is shown in which the robot 1 attaches a block 361 to the second palm 41-2 in the second manipulator MNP2 and presses the plate material 271 with the second palm 41-2 via the block 361. For example, the robot 1 includes an attracting mechanism in the second palm 41-2, performs pressing work in a state in which the block 361 is, for example, attracted by the second palm 41-2 and attached, and, after the pressing work is completed, removes the block 361 to a predetermined position (e.g., a region for removal).

As the shape, the size, and the like of the block 361, various shapes, sizes, and the like may be used. As the shape of the block 361, for example, a square column or a circular column may be used.

Note that, in FIG. 51, cross sections are shown concerning the jig 711 and the components (the plate material 271 and the springs 251 and 252).

In this example, in this example, for example, when the area of a pressing region is small, it is possible to perform the pressing using a block adjusted to the size or the shape of the pressing region.

Figure 52:
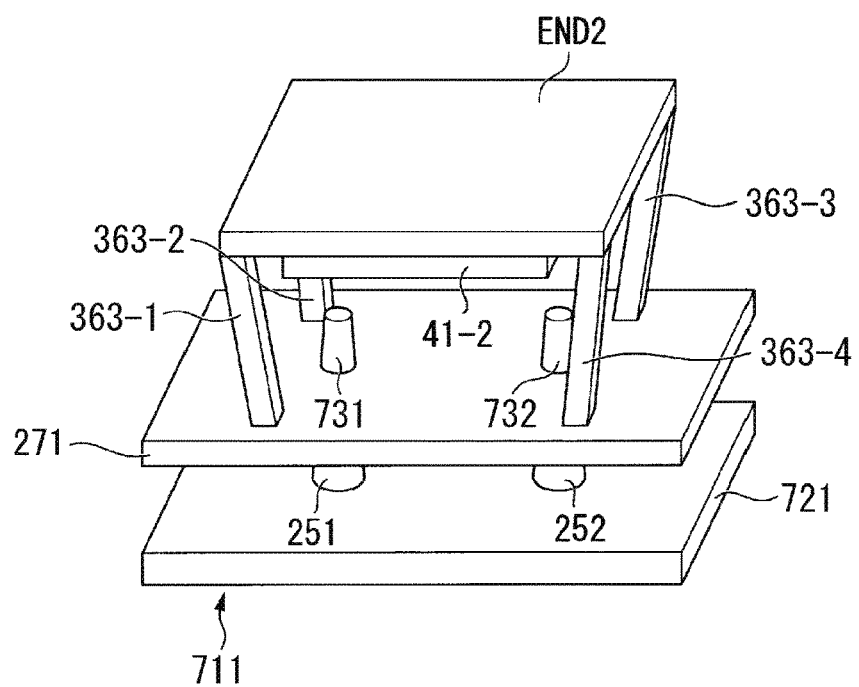
FIG. 52 is a diagram showing a modification of the pressing mechanism according to the embodiment of the invention.

FIG. 52 is a diagram showing a modification of the pressing mechanism according to the embodiment of the invention.

In FIG. 52, an example is shown in which the distal ends of four claws 363-1 to 363-4 of the second end effector END2 are brought into contact with the surface of the plate material 271 and the plate material 271 is pressed by the claws 363-1 to 363-4. In this case, the second palm 41-2 is housed on the inner side of the four claws 363-1 to 363-4 not to interfere with the plate material 271.

Figure 53:
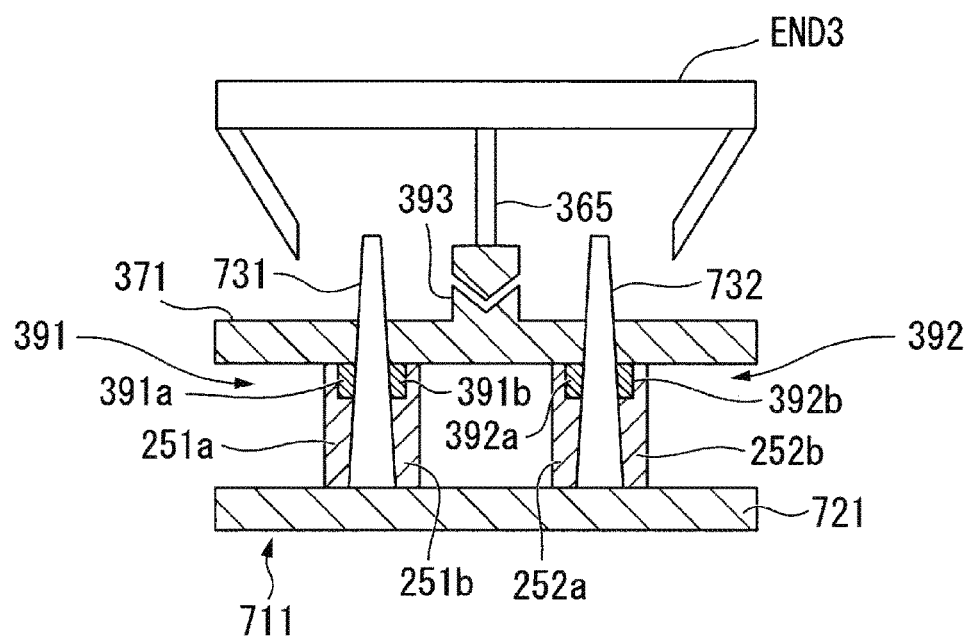
FIG. 53 is a diagram showing a modification of the pressing mechanism according to the embodiment of the invention.

FIG. 53 is a diagram showing a modification of the pressing mechanism according to the embodiment of the invention.

In the example shown in FIG. 53, a member 371 having another shape is used instead of the plate material 271 shown in FIGS. 45 to 50.

The member 371 is schematically a tabular object having a flat plane. The member 371 includes two hole portions 391 and 392 at a predetermined interval. On one surface of the member 371, the respective hole portions 391 and 392 include protruding portions formed along the contours of the holes. In this example, the two hole portions 391 and 392 have the same shape. The member 371 includes, on the other surface of the member 371, a protruding portion (referred to as fitting portion) 393 in the middle of the two hole portions 391 and 392. The member 371 is made of, for example, metal.

Note that, in FIG. 53, cross sections are shown concerning the jigs 711 and the components (the member 371 and the springs 251 and 252). In FIG. 53, one hole 391 (the protruding portion thereof) is shown as two portions 391a and 391b in the cross section. The other hole portion 392 (the protruding portion thereof) is shown as two portions 392a and 392b in the cross section.

In the example shown in FIG. 53, a distal end portion (referred to as fitting portion) 365 having another shape is used instead of the second palm 41-2 in an end effector END3.

In this example, the fitting portion 393 of the member 371 and the fitting portion 365 of the end effector END3 have different shapes that fit with each other.

In this example, in a state in which the fitting portion 365 of the end effector END5 is fit with the fitting portion 393 of the member 371, the robot 1 applies a force to the fitting portion 365 and presses the member 371.

Note that the robot 1 may press not only the palms, the claws, or the predetermined fitting portions of the end effectors or the block (an example of the jig) but also various parts of the end effectors or a jig against a pressing target and perform pressing work. As an example, the robot 1 may press a flat surface other than the palm of the end effector against the pressing target and perform the pressing work.

Figure 54:
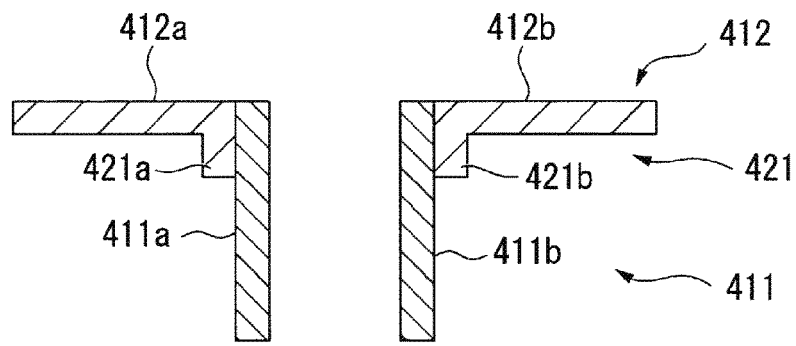
FIG. 54 is a diagram showing a modification concerning fitting according to the embodiment of the invention.

FIG. 54 is a diagram showing a modification concerning the fitting according to the embodiment of the invention.

In FIG. 54, concerning a spring 411 and a plate material 412, cross sections on a plane including the axis of the spring 411 (or the axis of a pin) are shown.

In the example shown in FIG. 54, one end (a fitting portion) of the spring 411 is fit in the inside (a fitting portion) of a hole portion 421 of the plate material 412. As in the examples shown in FIGS. 45 to 50, the springs may be fit to be located on the outer sides of the protrusions of the hole portions. Alternatively, as in the example shown in FIG. 54, the spring 411 may be fit to be located on the inner side of the hole portion 421.

Note that, in FIG. 54, the spring 411 is shown as two portions 411a and 411b in the cross section. In FIG. 54, the plate material 412 is shown as two portions 412a and 412b in the cross section. The hole portion 421 is shown as two portions 421a and 421b in the cross section.

Figure 55:
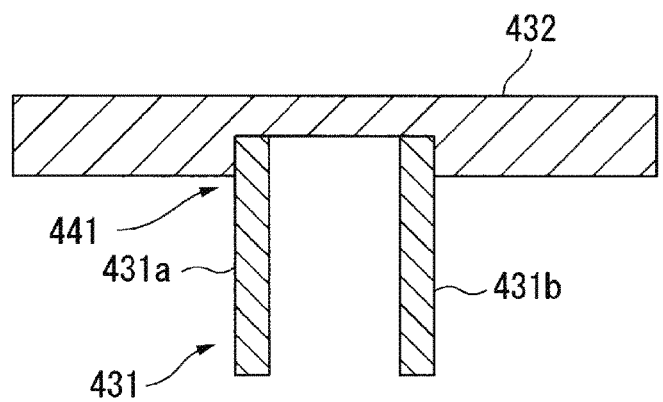
FIG. 55 is a diagram showing a modification concerning the fitting according to the embodiment of the invention.

FIG. 55 is a diagram showing a modification concerning the fitting according to the embodiment of the invention.

In FIG. 55, concerning a spring 431 and a plate material 432, cross sections on a plane including the axis of the spring 431 (or the axis of a pin) are shown.

In the example shown in FIG. 55, the plate material 432 includes a hollow section 441 on one surface. One end (a fitting portion) of the spring 431 is fit in the inner side (a fitting portion) of the hollow section 441 of the plate material 432.

Note that, in FIG. 55, the spring 431 is shown as two portions 431a and 431b in the cross section.

Figure 56:
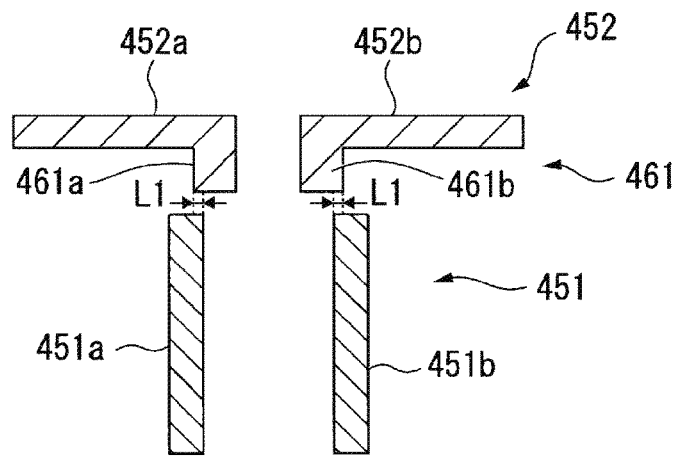
FIG. 56 is a diagram showing a modification concerning the fitting according to the embodiment of the invention.

FIG. 56 is a diagram showing a modification concerning the fitting according to the embodiment of the invention.

In FIG. 56, concerning a spring 451 and a plate material 452, cross sections on a plane including the axis of the spring 451 (or the axis of a pin) are shown.

In the example shown in FIG. 56, the spring 451 is fit in the outer side of a hole portion 461 of the plate material 452. In this case, in a state before the fitting, the surface of one end (one end on a fitting side) of the spring 451 and the surface of a protruding portion of the hole portion 461 of the plate material 452 are superimposed by a predetermined distance L1 and opposed to each other. Consequently, one end of the spring 451 is elastically deformed (or plastically deformed) and fit in the outer side of the hole portion 461 of the plate material 452. For example, the predetermined distance L1 is decided in advance according to an experiment or a theory.

Note that, in FIG. 56, the spring 451 is shown as two portions 451a and 451b in the cross section. In FIG. 56, the plate material 452 is shown as two portions 452a and 452b in the cross section. The hole portion 461 is shown as two portions 461a and 461b in the cross section.

Figure 57:
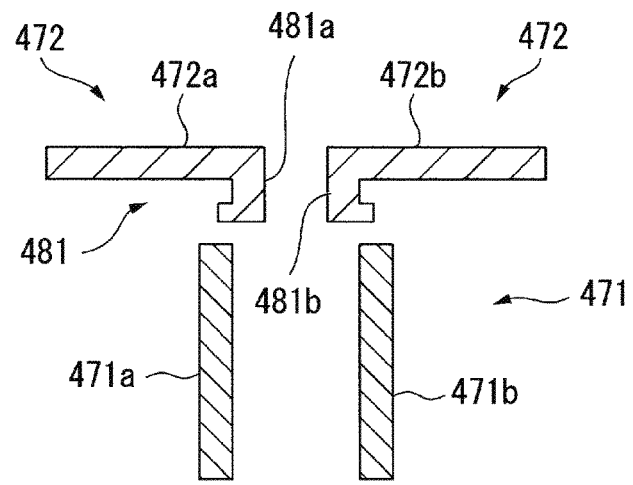
FIG. 57 is a diagram showing a modification concerning the fitting according to the embodiment of the invention.

FIG. 57 is a diagram showing a modification concerning the fitting according to the embodiment of the invention.

In FIG. 57, concerning a spring 471 and a plate material 472, cross sections on a plane including the axis of the spring 471 (or the axis of a pin) are shown.

In the example shown in FIG. 57, the spring 471 is fit in the outer side of a protruding portion of a hole portion 481 of the plate material 472. A convex section is provided at the distal end on the outer side (a side opposed to the spring 471) of the protruding portion of the hole portion 481 of the plate material 472. Consequently, in a state in which the protruding portion of the hole portion 481 of the plate material 472 and the spring 471 are fit, the convex section and the spring 471 are caught by each other. Therefore, it is possible to prevent the spring 471 from coming off the protruding portion of the hole portion 481 of the plate material 472 (compared with when the convex section is absent).

In this example, the convex section has a shape covering the entire circumference of the outer side of the protruding portion of the hole portion 481 of the plate material 472. However, another shape may be used.

Note that, in FIG. 57, the spring 471 is shown as two portions 471a and 471b in the cross section. In FIG. 57, the plate material 472 is shown as two portions 472a and 472b in the cross section. The hole portion 481 is shown as two portions 481a and 481b in the cross section.

Figure 58:
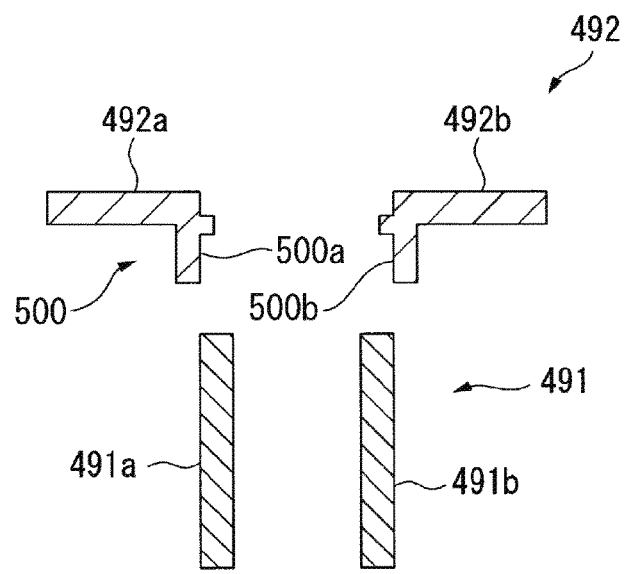
FIG. 58 is a diagram showing a modification concerning the fitting according to the embodiment of the invention.

FIG. 58 is a diagram showing a modification concerning the fitting according to the embodiment of the invention.

In FIG. 58, concerning a spring 491 and a plate material 492, cross sections on a plane including the axis of the spring 491 (or the axis of a pin) are shown.

In the example shown in FIG. 58, the spring 491 is fit in the inner side of a hole portion 500 of the plate material 492. A convex section is provided on the inner side of the hole portion 500 of the plate material 492. Consequently, in a state in which the hole portion 500 of the plate material 492 and the spring 491 are fit, the convex section and the spring 491 are caught by each other. Therefore, it is possible to prevent the spring 491 from coming off the hole portion 500 of the plate material 492 (compared with when the convex section is absent).

In this example, the convex section has a shape covering the entire circumference of the inner side of the hole portion 500 of the plate material 492. However, another shape may be used.

Note that, in FIG. 58, the spring 491 is shown as two portions 491a and 491b in the cross section. In FIG. 58, the plate material 492 is shown as two portions 492a and 492b in the cross section. The hole portion 500 is shown as two portions 500a and 500b in the cross section.

Figure 59:
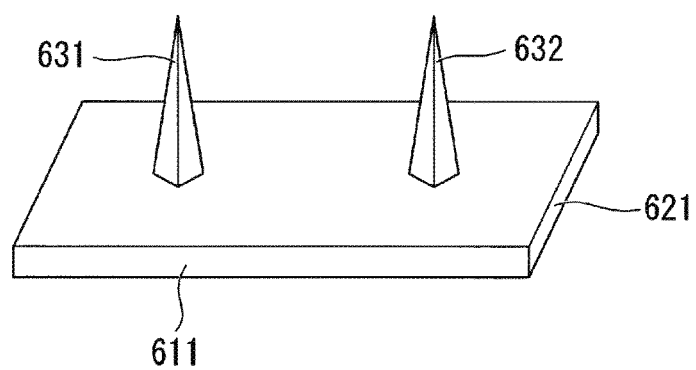
FIG. 59 is a diagram showing a modification of a jig according to the embodiment of the invention.

FIG. 59 is a diagram showing a modification of a jig 611 according to the embodiment of the invention.

The jig 611 includes a plate material 621 and two pins 631 and 632. The jig 611 in this example is different from the jig 711 shown in FIG. 41 in the shape of the pins 631 and 632. The other components are the same. In this example, the two pins 631 and 632 have the same shape. The pins 631 and 632 have a shape of a triangular or square column-shaped shaft (column). The pins 631 and 632 have a taper-like shape decreasing in diameter toward the distal ends (the tips in a direction away from the plate material 621).

As the shape of the pins of the jig, another shape may be used. For example, a shape of a circular or square column-shaped shaft (column) not including a taper may be used.

Note that, in this embodiment, as the component to be assembled with the springs, the tabular component is used. However, a component having another shape may be used.

In this embodiment, the two springs are simultaneously assembled to the component to be assembled. However, as another configuration example, work for assembling one spring to the component to be assembled may be performed. Work for simultaneously assembling three or more springs to the component to be assembled may be performed. For example, in the jig shown in FIG. 41, at least pins as many as the springs to be simultaneously assembled only have to be provided.

Outline of the Embodiments

As a configuration example, there is provided a robot (in the example shown in FIG. 1, the robot 1) that fits a first fitting portion (in the examples shown in FIGS. 45 to 50, the protruding portions of the hole portions 291 and 292) of an object (in the examples shown in FIGS. 45 to 50, the plate material 271, which is a component) and a second fitting portion (in the examples shown in FIGS. 45 to 50, the hole portions of the springs) of a spring (in the examples shown in FIGS. 45 to 50, the springs 251 and 252). In a state in which a first hole portion of the object and a second hole portion of the spring are inserted over a pin (in the examples shown in FIGS. 45 to 50, the pins 731 and 732 of the jig 711), the robot presses one of the object and the spring (in the examples shown in FIGS. 45 to 50, the jig 711 in which the springs are set) against the other in an axial direction of the pin to fit the first fitting portion and the second fitting portion.

As a configuration example, the robot includes a hand (in the example shown in FIG. 1, the first end effector END1 or the second end effector END2), a palm (in the example shown in FIG. 1, the first palm 41-1 or the second palm 41-2) is provided in the hand, and the robot presses the object or the spring with the palm.

As a configuration example, the first fitting portion side of the object is a plane, the plane and an axial direction of the pin are orthogonal, and the robot presses a surface of the palm against the plane in parallel (in the example shown in FIG. 49, presses the plane and the surface of the second palm 41-2 in parallel).

As a configuration example, the first fitting portion and the second fitting portion are tubular and, when the object or the spring is pressed, at least one of the first fitting portion and the second fitting portion is elastically deformed or plastically deformed and the first fitting portion and the second fitting portion are press-fit with each other (e.g., the examples shown in FIGS. 49 and 50).

As a configuration example, in the robot, the pin is taper-like (e.g., the example shown in FIG. 41).

As a configuration example, the robot includes a force sensor (in the example shown in FIG. 1, the force sensors 31-1 and 31-2) and presses the object or the spring on the basis of reaction of the force sensor until a force having a predetermined value (the predetermined threshold) or more is applied (e.g., the processing (in step S105) shown in FIG. 44).

As a configuration example, the robot includes an arm (in the example shown in FIG. 1, the first manipulator MNP1 or the second manipulator MNP2), a block (in the example shown in FIG. 51, the block 361) is attached to the arm, and the robot presses the object or the spring with the block.

As a configuration example, there is provided a control method (e.g., the control method shown in FIG. 44) for controlling a robot that fits a first fitting portion of an object and a second fitting portion of a spring. In a state in which a first hole portion of the object and a second hole portion of the spring are inserted over a pin, one of the object and the spring is pressed against the other in an axial direction of the pin by the robot to fit the first fitting portion and the second fitting portion.

The embodiments of the invention are explained in detail above with reference to the drawings. However, a specific configuration is not limited to the embodiment. Design and the like not departing from the spirit of the invention are also included in the invention.

Note that it is also possible to record (store), in a computer-readable recording medium (storage medium), a computer program for realizing functions of any components in the devices (e.g., the control device 51) explained above, cause a computer system to read the computer program, and execute the computer program. Note that the "computer system" includes an operating system (OS) or hardware such as peripheral devices. The "computer-readable recording medium" refers to a portable medium such as a flexible disk, a magneto-optical disk, a ROM (Read Only Memory), or a CD (Compact Disk)-ROM or a storage device such as a hard disk incorporated in the computer system. Further, the "computer-readable recording medium" includes a recording medium that stores a computer program for a fixed time such as a volatile memory (a RAM: Random Access Memory) inside a computer system functioning as a server or a client when a computer program is transmitted via a network such as the Internet or a communication line such as a telephone line.

The computer program may be transmitted from a computer system, which stores the computer program in a storage device, to another computer system via a transmission medium or by a transmission wave in the transmission medium. The "transmission medium", which transmits the computer program, refers to a medium having a function of transmitting information such as a network (a communication network) such as the Internet or a communication line (a communication wire) such as a telephone line.

The computer program may be a computer program for realizing a part of the functions explained above. Further, the computer program may be a computer program that can realize the functions in a combination with a computer program already recorded in the computer system, a so-called differential file (a differential program).

The entire disclosure of Japanese Patent Applications Nos. 0.2015-232823, filed Nov. 30, 2015 and 2015-232826, filed Nov. 30, 2015 are expressly incorporated by reference herein.

What is claimed is:

1. A robot comprising:
a first arm having a first end effector with a first contact section;
a second arm having a second end effector with a second contact section;
a sensing device;
a force sensor; and
a controller configured to move the first arm and the second arm to form a box body including a first plate body, a second plate body, a third plate body, and a fourth plate body, the first plate body and the second plate body being coupled along a first edge, the second plate body and the third plate body being coupled along a second edge, the third plate body and the fourth plate body being coupled along a third edge, and the fourth plate body and the first plate body being coupled along a fourth edge, wherein
the controller is configured to move the first contact section on the first arm into contact with the fourth edge, and to move the second contact section on the second arm into contact with the second edge when the box body is in a first state,
the controller is configured to apply torque to a joint of the robot to change the box body from the first state to a second state based on an output of the force sensor,
the first state is a folded-up state having a configuration where a first angle formed by the first plate body and the second plate body at the first edge is larger than a second angle formed by the second plate body and the third plate body at the second edge,
the second state has a configuration where the first angle formed by the first plate body and the second plate body is less than the first angle formed by the first plate body and the second plate body in the first state,
the sensor is configured to detect the first angle and the second angle, and
the controller is configured to apply a pushing force with the first arm into the fourth edge to move the fourth edge in a first direction extending from the third plate body to the first plate body and in a second direction extending from the third edge to the second edge in order to change the box body from the first state to the second state when the first contact section contacts the fourth edge and the second contact section contacts the second edge.

2. The robot according to claim 1, wherein the first angle in the folded-up state of the box body is 180 degrees.

3. The robot according to claim 1, wherein
the first contact section and the second contact section are respectively planes,
the controller is configured to set a surface of the first contact section and a surface of the second contact section to be parallel,
the controller is configured to bring the first contact section into contact with the fourth part, and
the controller is configured to bring the second contact section into contact with the second part.

4. The robot according to claim 1, wherein
the controller is configured to apply a pushing force with the first arm into the fourth edge to move the fourth edge in the second direction after applying the pushing force, with the first arm, to move the fourth part in the first direction and the second direction.

5. The robot according to claim 4, wherein
the second end effector is configured to grip the box body,
the controller is configured to control the second end effector to grip the box body after the controller applies a pushing force with the first arm into the fourth edge to move the fourth edge in the second direction, and
the controller is configured to move the first arm to press a jig against the box body to fix the first angle.

6. A control method for a robot, the control method comprising:
molding, by controlling a first arm and a second arm of a robot, a box body including a first plate body, a second plate body, a third plate body, and a fourth plate body, the first plate body and the second plate body being coupled along a first edge, the second plate body and the third plate body being coupled along a second edge, the third plate body and the fourth plate body being coupled along a third edge, and the fourth plate body and the first plate body being coupled along a fourth edge;
detecting, by a sensor, a first angle formed by the first plate body and the second plate body at the first edge and a second angle formed by the second plate body and the third plate body at the second edge;
moving, by a controller, a first contact section on the first arm into contact with the fourth edge and moving, by the controller, a second contact section on the second arm into contact with the second edge when the box body is in a first state;
applying, by the controller, a torque to a joint of the robot to change the box body from the first state to a second state based on an output of a force sensor; and
applying, by the controller, a pushing force with the first arm into the fourth edge to move the fourth edge in a first direction extending from the third plate body to the first plate body and in a second direction extending from the third edge to the second edge in order to change the box body from the first state to the second state when the first contact section contacts the fourth edge and the second contact section contacts the second edge, wherein
the first state is a folded-up state having a configuration where the first angle is larger than the second angle, and
the second state has a configuration where the first angle is less than the first angle in the first state.

* * * * *